(12) United States Patent
Murakami et al.

(10) Patent No.: US 6,570,703 B2
(45) Date of Patent: May 27, 2003

(54) OPTICAL AMPLIFYING APPARATUS, OPTICAL AMPLIFYING METHOD, AND OPTICAL COMMUNICATION SYSTEM

(75) Inventors: Makoto Murakami, Sapporo (JP);
Motoyoshi Sekiya, Kawasaki (JP);
Hideto Saito, Sapporo (JP); Hiroaki Tomofuji, Kawasaki (JP); Takeshi Sakamoto, Kawasaki (JP); Kazuo Yamane, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/968,892

(22) Filed: Oct. 3, 2001

(65) Prior Publication Data

US 2002/0039226 A1 Apr. 4, 2002

Related U.S. Application Data

(63) Continuation of application No. PCT/JP00/07514, filed on Oct. 26, 2000.

(30) Foreign Application Priority Data

Aug. 14, 2000 (JP) ........................................ 2000-245695

(51) Int. Cl.[7] .......................... H04B 10/08; G02F 1/35; H01S 3/10
(52) U.S. Cl. .............. 359/344.42; 359/177; 359/344.11
(58) Field of Search .................................. 359/161, 177, 359/344.41, 344.42

(56) References Cited

U.S. PATENT DOCUMENTS

| | | | | | |
|---|---|---|---|---|---|
| 5,506,724 A | * | 4/1996 | Shimizu et al. | ............. | 359/341 |
| 5,664,131 A | * | 9/1997 | Sugiya | ........................ | 359/341 |
| 6,023,366 A | * | 2/2000 | Kinoshita | .................... | 359/341 |
| 6,055,092 A | * | 4/2000 | Sugaya et al. | ............... | 359/337 |
| 6,067,187 A | * | 5/2000 | Onaka et al. | ................ | 359/341 |

FOREIGN PATENT DOCUMENTS

| | | |
|---|---|---|
| JP | 8-139672 | 5/1996 |
| JP | 9-326519 | 12/1997 |
| JP | 11-112434 | 4/1999 |
| JP | 2000-106464 | 4/2000 |

OTHER PUBLICATIONS

Pratt et al; IEEE Photonics Technology Letters, vol. 12, #81, abstract only herewith, Aug. 2000.*

* cited by examiner

Primary Examiner—Nelson Moskowitz
(74) Attorney, Agent, or Firm—Staas & Halsey LLP

(57) ABSTRACT

An optical amplifying apparatus of the present invention comprises a correction part for correcting a predetermined fixed value of an output optical level by a correction amount according to an optical power of amplified spontaneous emission (ASE). The correction amount is, for example, computed by predetermined formulas. According to the present invention, when a WDM optical signal is optically amplified, the output is fixedly amplified for each channel by the correction amount which is a value obtained with the ASE levels taken into consideration, so that a fluctuation in the level of the average optical power of the channels is suppressed even if an optical signal is dropped/added therefrom/thereto during repeated transmissions.

12 Claims, 18 Drawing Sheets

FIG.8
A.
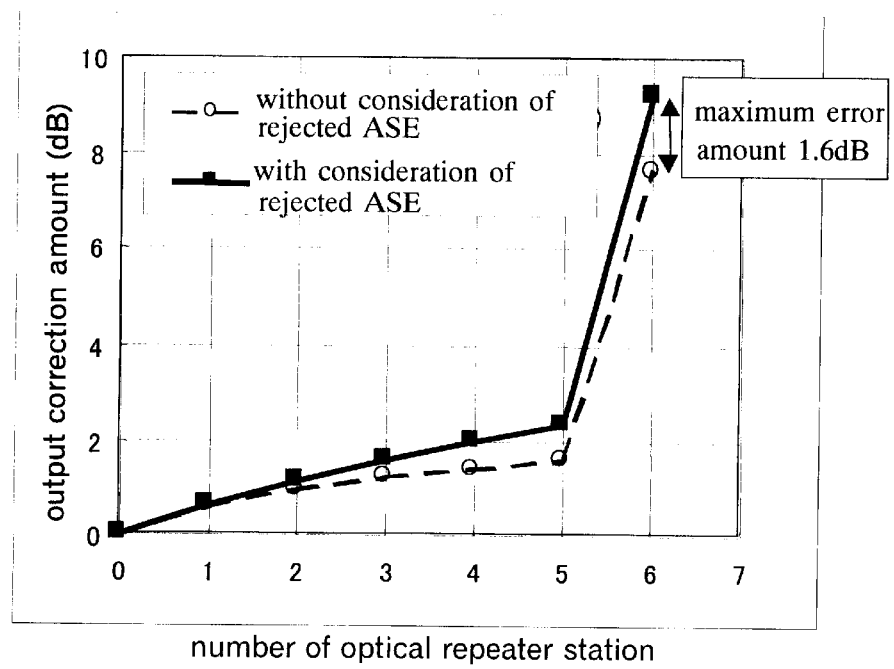
B.
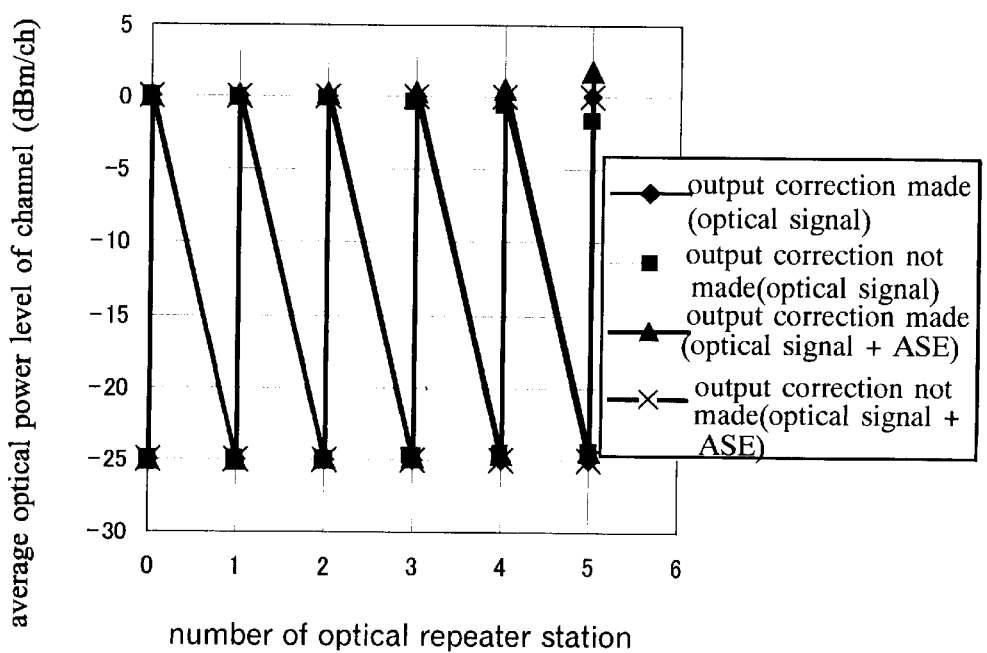

FIG.17
A.
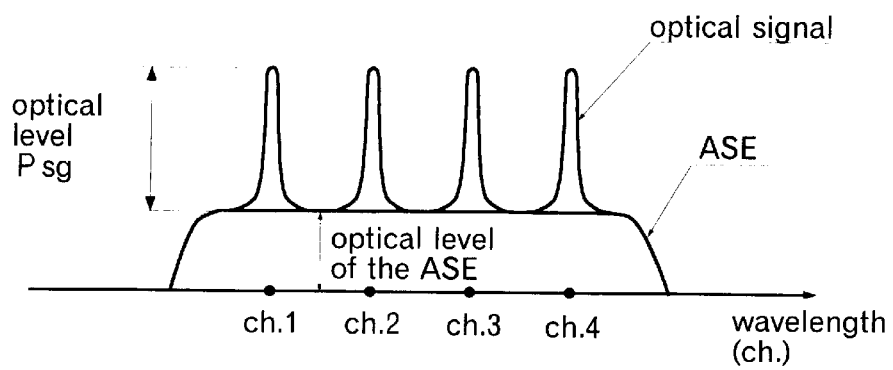
B.
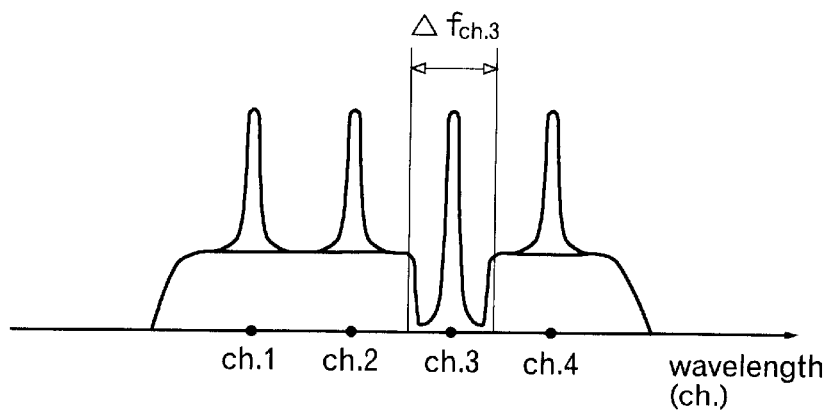
C.
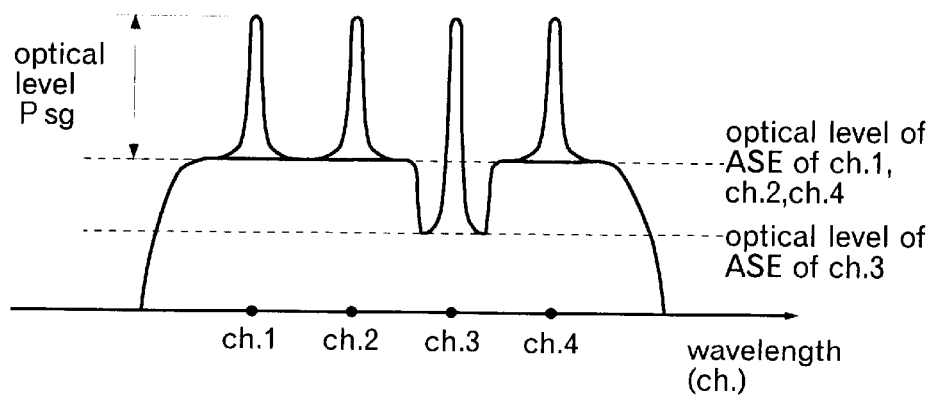

FIG.18
A.
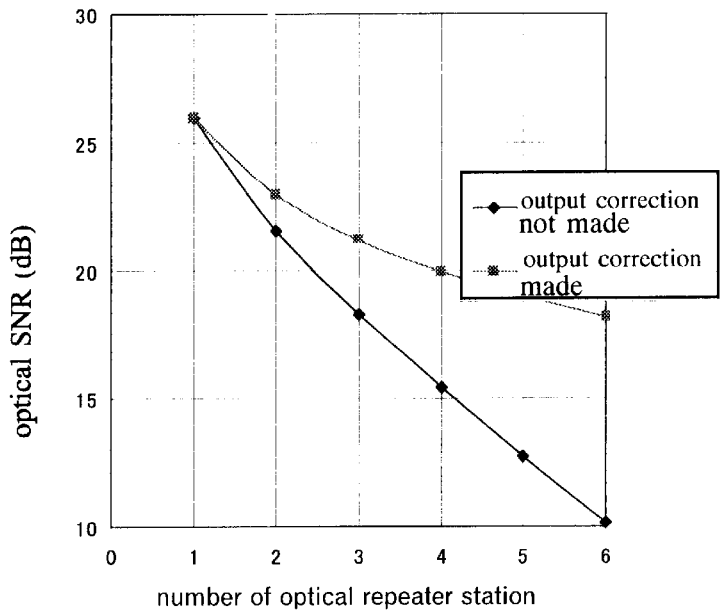
B.
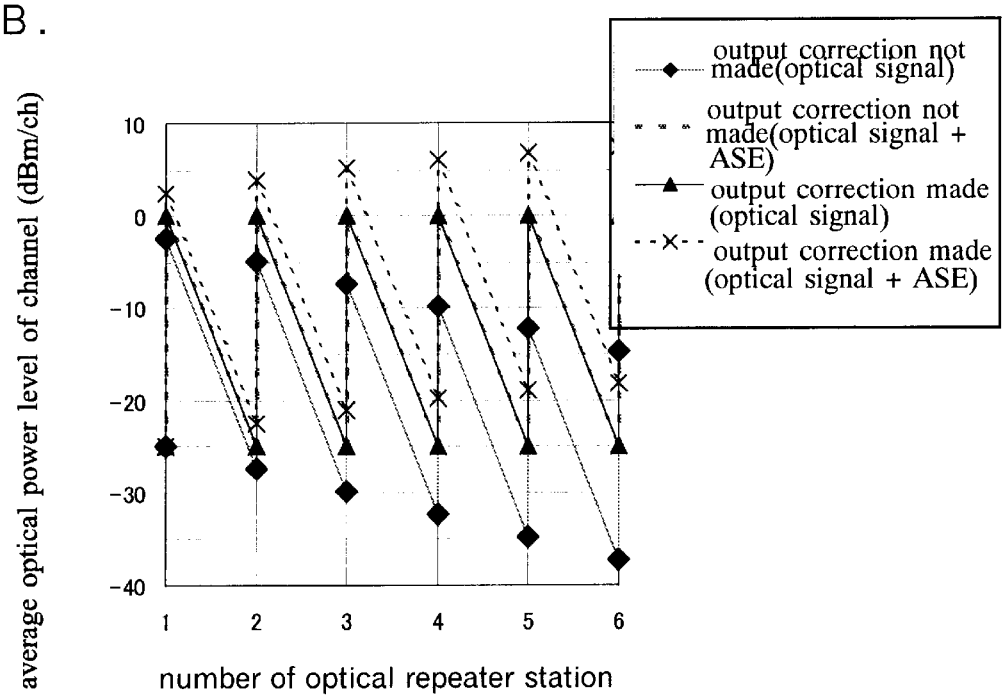

OPTICAL AMPLIFYING APPARATUS, OPTICAL AMPLIFYING METHOD, AND OPTICAL COMMUNICATION SYSTEM

CROSS REFERENCE TO RELATED APPLICATION

This application is a continuation application of International Application PCT/JP00/07514, filed Oct. 26, 2000 and designating the U.S.

BACKGROUND OF THE INVENTION

1. Field of the Invention

The present invention relates to an optical amplifying apparatus which is used in an optical communication system or the like and, more particularly, to an optical amplifying apparatus and an optical amplifying method which can amplify light at a predetermined level, even when a predetermined optical signal is rejected from a wavelength-division multiplexed optical signal in an optical repeater station of the optical communication system. Further, it relates to an optical communication system utilizing the optical amplifying apparatus.

2. Description of the Related Art

FIG. 16 is a view showing the structure of a conventional optical communication system.

As in FIG. 16, the optical communication system is structured by including an optical transmitting station 501 which generates a WDM optical signal in which a plurality of optical signals in the number of m with different wavelengths from each other are wavelength-multiplexed, an optical transmission line 502 through which the WDM optical signal outputted from the optical transmitting station 501 is transmitted, and an optical receiving station 503 into which the transmitted WDM optical signal is inputted to be received and processed. Moreover, in the optical communication system, optical repeater stations 504 are connected in the optical transmission line 502. A plurality of the optical repeater stations 504 are provided in the optical transmission line 502 as necessary, and each of the optical repeater stations 504 may include an optical amplifier 531 which amplifies the WDM optical signal to a predetermined optical level in order to compensate transmission loss occurring in the optical transmission line 502, or it may include an optical add/drop multiplexer (hereinafter abbreviated to "OADM") 532 for dropping/adding an optical signal corresponding to a predetermined channel (hereinafter abbreviated to "ch.") from/to the WDM optical signal.

The optical transmitting station 501 is structured by including, for example, a plurality of optical senders (hereinafter abbreviated to "OS") 511-1 to 511-m in the number of m, each of which generates an optical signal corresponding to the respective channels of the WDM optical signal, an optical multiplexer (hereinafter abbreviated to "MUX") 512 which multiplexes wavelengths of the respective optical signals outputted from the OSs 511-1 to 511-m, and an optical amplifier 513 which amplifies the WDM optical signal outputted from the MUX 512.

The optical receiving station 503 is structured by including, for example, an optical amplifier 521, an optical demultiplexer (hereinafter abbreviated to "DEMUX") 522 and optical receivers (hereinafter abbreviated to "OR") 523-1 to 523-m. The WDM optical signal which is inputted from the optical transmission line 502 into the optical amplifier 521 is amplified therein and outputted to the DEMUX 522, in which its wavelength is demultiplexed to each of the optical signals corresponding to the respective channels. The demultiplexed optical signals of the respective channels are inputted into the ORs 523-1 to 523-m, respectively, each of which is structured by including a photo diode, a demodulator and so on, to be received and processed therein.

The optical amplifying apparatus 531 of the optical repeater station 504 is structured by including a first optical fiber amplifier doped with an rare earth element, an optical attenuator, and a second optical fiber amplifier doped with an rare earth element. The rare earth element is selected corresponding to an amplification wavelength band as necessary and, for example, an erbium element (elemental symbol: Er) is used in amplifying a 1550 nm band. The optical fiber amplifier is designed to obtain an appropriate gain with a predetermined wavelength multiplexing number so that a gain deviation becomes 0, and it is controlled to obtain the constant gain (constant gain control). The optical attenuator controls the optical amplifying apparatus 531 to control its output constantly.

The OADM 532 of the optical repeater station 504 is structured by including, for example, an optical coupler, an optical filter and an optical multiplexer/demultiplexer. The inputted WDM optical signal is divided into two in the optical coupler, and one of these is inputted into the optical filter and the other is used for receiving/processing a predetermined optical signal corresponding to a channel to be dropped in the OADM. The optical filter filters the inputted WDM optical signal to reject the predetermined optical signal. The optical multiplexer/demultiplexer multiplexes wavelengths of the WDM optical signal from which the predetermined optical signal is rejected and an optical signal to be newly added in the optical repeater station 504.

How the WDM optical signal is transmitted in the optical communication system like the above is explained as follows. When, for example, m is 4, that is, when a 4-wave WDM optical signal is transmitted, it is generated in the optical transmitting station 501 and repeated/amplified in an optical repeater station 504-1, an optical signal corresponding to, for example, ch. 3 is dropped/added therefrom/thereto in an optical repeater station 504-2, and it is repeated/amplified in an optical repeater station 504-3. Thus, it is repeated/amplified and dropped/added in the optical repeater stations 504 in sequence, to be received in the optical receiving station 503. In this case, a cutoff wavelength of the optical filter of the OADM 532-1 is set so as to filter the ch. 3.

FIG. 17 are views showing states of the 4-wave wavelength-division multiplexed optical signal being amplified.

FIG. 17A shows a state of the 4-wave WDM optical signal after being amplified in the optical repeater station 504-1, FIG. 17B shows a state in which the optical signal corresponding to the ch. 3 is dropped therefrom and then newly added thereto in the optical repeater station 504-2, and FIG. 17C shows a state of the WDM optical signal, to which the ch. 3 is added/dropped thereto/therefrom, after being amplified in the optical repeater station 504-3. Lateral axes of FIG. 17 show a wavelength (ch.) and vertical axes show an optical level.

As shown in FIG. 17B, when the predetermined optical signal (ch. 3, in FIG. 17B) is dropped/added from/to the WDM optical signal, the optical filter of the OADM 532 rejects the predetermined optical signal including ASE. Therefore, as shown in FIG. 17C, the WDM optical signal after the predetermined optical signal is dropped/added therefrom/thereto has the different optical levels of the ASE between the respective optical signals, after being amplified in the optical repeater station 504.

Supposing that, for example, the 4-wave WDM optical signal is amplified in an optical repeater station 1, the ch. 3 is dropped/added therefrom/thereto in an optical repeater station 2 and it is amplified in an optical repeater station 3. As to an output from the optical repeater station 3, as shown in FIG. 17C, the ASEs of ch. 1, ch. 2 and ch. 4 have a noise level from the two optical repeater stations, but the ASE of the ch. 3 has a noise level from one optical repeater station. When the ch. 3 is dropped/added therefrom/thereto during the transmission, optical levels of the ASEs differ between the ch. 1, ch. 2, ch. 4 and the ch. 3.

It should be mentioned that the optical amplifying apparatuses 513, 531, 521 which are provided in the optical transmitting station 501, optical repeater station 504 and the optical receiving station 503 are normally controlled so that outputs from the optical amplifying apparatuses become constant (output constant control). This is because an input optical level of the optical transmission line 502 is limited in order to prevent nonlinear optical effects such as a self-phase modulation (SPM), a cross-phase modulation (XPM) and the like from occurring in the optical transmission line 502.

As shown in FIG. 17A, since amplified spontaneous emission (ASE) is usually caused in the optical amplifying apparatus, the ASE is added to the output from the optical amplifying apparatus. When its output is constantly controlled so that an output per wave becomes $P_0$, the following formulas hold therefore:

$$P_{Tout} = m \times P_0 \quad \text{(Formula 1)}$$
$$= P_{Tin} \times G + 2n_{sp}h\nu\Delta f\,(G-1)$$

$$\Delta P_0 = \{2n_{sp}h\nu\Delta f(G-1)\}/m \quad \text{(Formula 2)}$$

Incidentally, m is a multiplexing number of the wavelength-division multiplexed optical signal (wavelength number, channel number), $P_{Tout}$ is a total output of the optical amplifying apparatus, $P_{Tin}$ is a total input of the optical amplifying apparatus, $n_{sp}$ is a spontaneous emission coefficient of the optical amplifying apparatus, G is a gain of the optical amplifying apparatus, hν is energy (j) of a photon, and Δf is a bandwidth of the optical amplifying apparatus.

Since the total output power is controlled fixedly according to the output constant control, a second term of the formula 1 is an error component as shown in the formula 1, and hence the optical level of the optical signal per wave (per channel) becomes smaller than the predetermined optical level $P_0$ by the $\Delta P_0$.

For this reason, in the conventional art, the optical amplifying apparatuses 513, 531, 521 correct the $\Delta P_0$ and constantly control the outputs so that the optical levels of the optical signals from the optical amplifying apparatuses 513, 531, 521 become $P_0$.

By thus correcting the $\Delta P_0$, an optical signal-to-noise ratio (hereinafter abbreviated to "optical SNR") after a multi-repeating is improved.

Here, the optical SNR is expressed as:

$$1/\text{Optical SNR} = 1/\text{Optical SNR}(1) + 1/\text{Optical SNR}(2) + \ldots + 1/\text{Optical SNR}(n) \quad \text{(Formula 3)}$$

$$\text{Optical SNR}(j) = P_{inj}/(2n_{spj}h\nu\Delta f) \quad \text{(Formula 4)}$$

Incidentally, the optical SNR is an optical SNR after passing an nth optical amplifying apparatus, the optical SNR (j) is an optical SNR when only a jth optical amplifying apparatus is used, $P_{inj}$ is optical power of the input light of the jth optical amplifying apparatus, and $n_{spj}$ is ASE in the jth optical amplifying apparatus.

FIG. 18 are views showing the optical SNR and a level diagram with/without output correction.

FIG. 18A is a view showing a difference between the optical SNR with the output correction and without the output correction, in which ■ shows the case with the output correction and ♦ shows the case without the output correction. A lateral axis shows a number of the optical repeater station (number of the optical amplifying apparatus) and a vertical axis shows the optical SNR shown in dB. FIG. 18B is a view showing a difference between the level diagram with the output correction and without the output correction, in which ▲ shows an optical level of the optical signal with the output correction, × shows an optical level of the optical signal with the output correction and with the ASE being added thereto, ♦ shows an optical level of the optical signal without the output correction, and ● shows an optical level of the optical signal without the output correction and with the ASE being added thereto. A lateral axis shows a number of the optical repeater station (number of the optical amplifying apparatus), and a vertical axis shows a level of average optical power of the channel shown in dBm/ch.

As conditions of a simulation, gain deviations of the optical amplifying apparatuses 513, 531, 521, a deviation of the optical transmission line 502 and the like are set as 0, the output optical levels of the optical amplifying apparatuses 513, 531, 521 without the output correction are set as 0 dBm/ch., transmission loss of the optical transmission line 502 is set as 25 dB, a noise figure (hereinafter abbreviated to "NF") is set as 7 dB, and an amplification bandwidth is set as 30 nm. Further, the optical repeater station 404 does not include the OADM 532.

As shown in FIG. 18, transmission characteristics are improved with the output correction for compensating the ASE, compared with the case without the output correction. However, in the output correction, the ASE is assumed to be uniformly added to the respective optical signals of the WDM optical signal, and the level of the average optical power of the channel increases as it transmits through the optical repeater stations.

As described above, the optical filter of the OADM rejects the predetermined optical signal including the ASE. Hence, when amplified in the optical amplifying apparatuses in the optical repeater stations, the WDM optical signal after the predetermined optical signal is dropped/added therefrom/thereto is not uniform and its ASE level differs between the respective optical signals. Therefore, the suitable output correction is difficult to be achieved in the conventional art.

Moreover, since the optical fiber amplifier of the conventional optical amplifying apparatus is designed to obtain the appropriate gain with the predetermined wavelength multiplexing number and is controlled to obtain the constant gain, the gain deviation is caused when the multiplexing number changes in the OADM because the appropriate gain is not obtained.

It is an object of the present invention to provide the optical amplifying apparatus and the optical amplifying method which correct the output with consideration of the optical level of the ASE by each optical signal.

It is another object of the present invention to provide the optical communication system utilizing the optical amplifying apparatus.

SUMMARY OF THE INVENTION

The above objects are achieved by an optical amplifying apparatus comprising a correction part for correcting a predetermined fixed value of an output optical level by a correction amount according to an optical power of amplified spontaneous emission. The correction amount is computed by, for example, predetermined formulas. Further, the correction amount is obtained by adjusting both or one of a gain of the first optical amplifying part and a gain of the second optical amplifying part in the optical amplifying apparatus which comprises, for example, an optical attenuating part provided between a first optical amplifying part and a second optical amplifying part, for attenuating output light of the first optical amplifying part, and a control part for adjusting the output optical level to the predetermined fixed value.

Moreover, the above objects are achieved by an optical communication system comprising an optical transmitting station, an optical repeater station, an optical receiving station, and an optical transmission line for connecting the respective stations, and wherein the optical repeater station comprises the above correction part.

According to the present invention, when a WDM optical signal is optically amplified, the output is fixedly amplified for each channel by the correction amount which is a value obtained with the ASE levels taken into consideration, so that a fluctuation in the level of average optical power of the channels is suppressed even if an optical signal is dropped/added therefrom/thereto during repeated transmissions. Therefore, the optical communication system according to the present invention realizes suppression in gain deviation among the optical signals which correspond to each of the channels of the WDM optical signal. According to the optical communication system in the present invention, it is possible to prevent an optical SNR from degrading due to a decrease in the number of channels even when a number of times an optical signal is wavelength-multiplexed is small.

BRIEF DESCRITPTION OF THE DRAWINGS

The nature, principle, and utility of the invention will become more apparent from the following detailed description when read in conjunction with the accompanying drawings in which like parts are designated by identical reference numbers, in which:

FIG. 8 are views showing simulation results of the optical communication system according to the second embodiment;

FIG. 17 show an amplified 4-wave wavelength-division multiplexed optical signal; and FIG. 18 are views showing an optical SNR and a level diagram with/without output correction.

DESCRIPTION OF THE PREFERRED EMBODIMENTS

Figure 1:
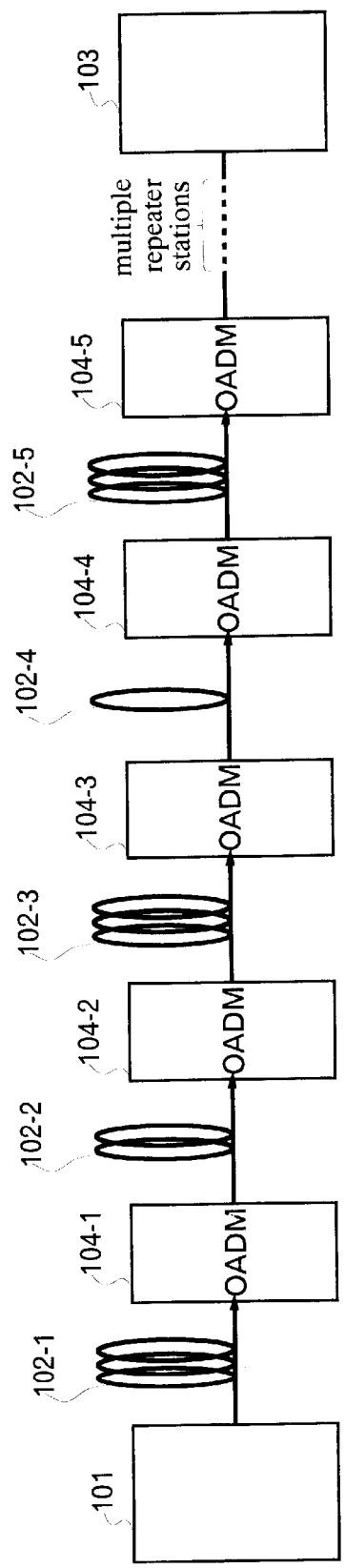
FIG. 1 is a view showing the structure of an optical communication system according to a second embodiment.

Hereinafter, preferred embodiments of the present invention will be explained with reference to the drawings. Incidentally, the same numerals and symbols are given to the same structures in the respective drawings, and explanations thereof are omitted.

(First Embodiment)

The first embodiment is an embodiment of an optical amplifying apparatus according to the present invention.

The first embodiment relates to the optical amplifying apparatus for amplifying input light so that optical power of output light has a predetermined fixed value, that is, the optical amplifying apparatus with its output being constantly controlled. The optical amplifying apparatus is structured by including a first optical amplifying part which amplifies the input light, an optical attenuating part which attenuates output light of the first optical amplifying part, a second optical amplifying part which amplifies output light of the optical attenuating part, a control part which adjusts attenuation of the optical attenuating part so that the predetermined fixed value is obtained, and a correction part.

The correction part adjusts either one of a gain of the first optical amplifying part or a gain of the second optical amplifying part or both of these, thereby obtaining a correction amount based on optical power of amplified spontaneous emission which is included in the input light. The predetermined fixed value is corrected according to the correction amount. For this reason, an output optical level is allowed by the optical amplifying apparatus to be the predetermined fixed value, even when the optical power of the amplified spontaneous emission varies from one wavelength band to another.

Next, the correction amount will be explained.

The output of the optical amplifying apparatus before the output correction can be expressed as:

$$P_{out} = m_1 \times P_0 = m_1 P_{in} G_1 + 2h\nu n_{sp1}(G_1 - 1)\Delta f \quad \text{(Formula 5)}$$

Further, the output of the optical amplifying apparatus after the output correction can be expressed as:

$$P_{outA} = P_{out} + \Delta P_{out} \quad \text{(Formula 6)}$$

$$= m_1 P_{in1} G_{A1} + 2 \, h\nu n_{sp1}(G_{A1} - 1) \, \Delta f$$

Incidentally, $P_{out}$ is output optical power (W) of the optical amplifying apparatus before the output correction (optical power of an optical signal added with the ASE), $P_{outA}$ is output optical power (W) of the optical amplifying apparatus after the output correction (the optical power of the optical signal added with the ASE), $\Delta P_{out}$ is the correction amount, PO is output optical power (W) per wave, $P_{inj}$ is optical power (W) of input light in a jth optical amplifying apparatus, $m_j$ is a multiplexing number of a WDM optical signal which is inputted into the jth optical amplifying apparatus, $G_j$ is a gain of the jth optical amplifying apparatus before the output correction, $G_{Aj}$ is a gain of the jth optical amplifying apparatus after the output correction, $n_{spj}$ is a spontaneous emission coefficient in the jth optical amplifying apparatus, $h\nu$ is energy (j) of a photon, and $\Delta f$ is a band (Hz) of the optical amplifying apparatus.

In order to allow the output optical power per wave to be $P_0$, it is suitable to add the correction amount $\Delta P_{out}$ to an output value before the output correction so that the following formula holds therefore:

$$P_{out} = m_1 P_o \quad \text{(Formula 7)}$$

$$= m_1 P_{in1} G_{A1}$$

And hence, the following formula holds therefore:

$$\Delta P_{out} = 2h\nu n_{sp1}(G_{A1} - 1)\Delta f \quad \text{(Formula 8)}$$

When a ratio (increase factor of output $\Delta_1$) of the correction amount $\Delta P_{out}$ to the output optical power $P_{out}$ before the output correction is determined by using the formula 7 and the formula 8, the following formula holds therefore:

$$\frac{\Delta P_{out}}{P_{out}} = \frac{\Delta P_{out}}{m_1 P_{in1} G_{A1}} \quad \text{(Formula 9)}$$

$$= \frac{2 \, h\nu n_{sp1}(G_{A1} - 1)\Delta f}{m_1 P_{in1} G_{A1}}$$

$$= \frac{2 \, h\nu n_{sp1}\Delta f}{m_1 P_{in1}} = \Gamma 1 = \Delta 1$$

Since the gain of the optical amplifying apparatus is sufficiently large with respect to 1, it is approximated to $G_{A1} = G_{A1} - 1$.

Moreover, in an optical amplifying apparatus on a 2-stage, it is necessary to increase its output by the correction amount of the optical amplifying apparatus on its preceding stage, and further, the ASE which occurs in the optical amplifying apparatus on the 2-stage itself is added thereto. Therefore, in determining a ratio (increase factor of output $\Delta_2$) of the correction amount $\Delta P_{out}$ to the output optical power $P_{out}$ before the output correction on the 2-stage, the following formula holds therefore:

$$\Delta 2 = \Gamma 1 + \Gamma 2 \quad \text{(Formula 10)}$$

$$= \frac{2 \, h\nu n_{sp1}\Delta f}{m_1 P_{in1}} + \frac{2 \, h\nu n_{sp2}\Delta f}{m_1 P_{in2}}$$

Generally, an increase factor of output $\Delta_k$ in an optical amplifying apparatus on a k-stage can be expressed as:

$$\Delta_k = \sum_{j=1}^{k} \Delta \Gamma_j = \sum_{j=1}^{k} \frac{2 \, h\nu n_{spj}\Delta f}{m_k P_{inj}} \quad \text{(Formula 11)}$$

$$= \frac{h\nu\Delta f}{m_k} \sum_{j=1}^{k} \frac{2n_{spj}}{P_{inj}}$$

$$= \frac{h\nu\Delta f}{m_k} \sum_{j=1}^{k} c_k$$

$$= \frac{h\nu\Delta f}{m_k} d_k$$

It should be mentioned that $c_k$ and $d_k$ are the formula 12 and the formula 13, respectively.

$$c_k = \frac{2n_{spk}}{P_{ink}} \quad \text{(Formula 12)}$$

$$d_k = \sum_{j=1}^{k} \frac{2n_{spj}}{P_{inj}} \quad \text{(Formula 13)}$$

Meanwhile, the spontaneous emission coefficient $n_{spj}$ in the jth optical amplifying apparatus is given by:

$$n_{spk} = \frac{1}{2} \times 10^{NF_k/10} \quad \text{(Formula 14)}$$

And the optical power of the input light $P_{inj}$ of the jth optical amplifying apparatus is given by:

$$10\text{Log}(P_{ink}) =$$

$$\begin{cases} 10\text{Log}\left(\frac{P_{Tink}}{m_k}\right) - 10\text{Log}(1 + \delta_{k-1}) & \text{(Formula 15-1)} \\ \quad (\text{where } m^k = m^{k-1}) \\ 10\text{Log}\left(\frac{P_{Tink}}{m_k}\right) - 10\text{Log}(1 + \delta_{Ak-1}) & \text{(Formula 15-2)} \\ \quad (\text{where } m^k \neq m^{k-1}) \end{cases}$$

Incidentally, Log is a logarithm taking a base as 10, $\delta_{k-1}$ is an output correction amount of the optical amplifying apparatus on the preceding stage in measuring input optical power (actually executed value), $\delta_{Ak-1}$ is an output correction amount of the optical amplifying apparatus on the preceding stage in using numbers of an input optical signal (multiplexing number, channel number, wavelength number) of the optical amplifying apparatus on the k-stage, $NF_k$ is a noise figure (dB) in the optical amplifying apparatus on the k-stage, and $P_{Tink}$ is total input power of the optical amplifying apparatus on the k-stage. Using the formula 14 and the formula 15, the formula 11 can be calculated as:

$$\Delta_k = \frac{h\nu\Delta f}{m_k}[d_{k-1} + C_k] = \quad \text{(Formula 16)}$$

$$\frac{h\nu\Delta f}{m_k}[d_{k-1} + 10^{\left[NF_k - 10\text{Log}\left(\frac{P_{Tink}}{m_k}\right) + 10\text{Log}(1 + \delta_{k-1})\right]/10}]$$

where $\delta_{k-1}$ is $\delta_{Ak-1}$ when $m_k \neq m_{k-1}$

It should be mentioned that $\delta_{k-1}$ is $\delta_{Ak-1}$ when $m_k \neq m_{k-1}$.

$\Delta f$ is the band of the optical amplifying apparatus as a whole, and supposing that a bandwidth of the ASE which is rejected in order to drop the optical signal is $\Delta f_{ch}$. (for example, $\Delta f_{ch.}3$ is shown in FIG. 17) and a channel number (wavelength number) which is rejected is n, the formula 16 can be expressed as:

$$\Delta_k = \frac{h\upsilon}{m_k}\left[(\Delta f - \Delta f_{ch.}n)d_{k-1} + \left(10^{[NF_k - 10\text{Log}\left(\frac{P_{Tink}}{m_k}\right) + 10\text{Log}(1+\delta_{k-1})]/10}\right)\Delta f\right] \quad \text{(Formula 17)}$$

where $\delta_{k-1}$ is $\delta_{Ak-1}$ when $m_k \neq m_{k-1}$

It should be mentioned that $\delta_{k-1}$ is $\delta_{Ak-1}$ when $M_k \neq M_{k-1}$.

Since $\Delta P_{out} = \Delta_k \times P_{out}$, $\Delta P_{out}$ with consideration of ASE level of each of the optical signals (on each of the channels) of the WDM optical signal is determined from the formula 17.

Therefore, in the optical amplifying apparatus on the k-stage, it is suitable to carry out the output correction by $\Delta P_{out}$ which is calculated based on the formula 17.

Supposing that a bandwidth of the ASE which is rejected in order to drop a ch. j is $\Delta f_{ch.}(j)$, accumulated ASE information from an optical amplifying part in an optical transmitting station to an optical amplifying part in an optical repeater station on the k-stage in a band of ch. j is $d_k(j)$, a bandwidth of the ASE which is not rejected is $\Delta f_{ch.}(\text{other})$, accumulated ASE information from the optical amplifying part in the optical transmitting station to the optical amplifying part in the optical repeater station on the k-stage in the bandwidth of the ASE $\Delta f_{ch.}$ (other) which is not rejected in the band $\Delta f$ of the optical amplifying part is $d_k(\text{other})$, the formula 11 can be expressed as:

$$\Delta_k = \frac{h\upsilon\Delta f}{m_k}d_k = \quad \text{(Formula 18)}$$
$$\frac{h\upsilon}{m_k}\left[\sum_{j=1}^{k} d_k(j)\Delta f_{ch.}(j) + d_{ch.}(\text{other})\Delta f_{ch.}(\text{other})\right]$$

By using the formula 18, the accumulation of the ASE is controlled for each channel, and the output correction amount is computed also for each channel. In this case, when a channel if added/dropped thereto/therefrom in an optical amplifying apparatus on a k−1-stage, an ASE optical level of the channel becomes 0 and hence, it is set that $\delta_{k-1}=0$. Here, $d_k(j)\Delta f_{ch.}(j)$ corresponds to accumulated ASE information $e_k(j)$ which is optical power of the amplified spontaneous emission accumulated to the input light for each channel, and $d_{ch.}(\text{other})\Delta f_{ch.}(\text{other})$ corresponds to out-band accumulated ASE information $e_k(\text{other})$ which is optical power of the amplified spontaneous emission accumulated to light being outside of a wavelength band of the WDM optical signal.

Moreover, in computing the output correction amount, an input noise figure to average input power per wave (per channel) may be used as a noise figure NF, but it is preferable to use a noise figure NF(j) of each of wavelengths (each of channels) because the noise figure NF has wavelength dependency. In this case, $d_k(j)$ in the formula 18 is:

$$d_k(j) = \left[d_{k-1}(j) + 10^{[NF_k(j) - 10\text{Log}\left(\frac{P_{Tink}}{m_k}\right) + 10\text{Log}(1+\delta_{k-1})]/10}\right] \quad \text{(Formula 19)}$$

where $\delta_{k-1}$ is $\delta_{Ak-1}$ when $m_k \neq m_{k-1}$

As described above, according to the present invention, in optically amplifying the WDM optical signal, the output is amplified fixedly by the correction amount with consideration of the ASE level on each of the channels, so that a fluctuation in the level of the average optical power of the channel is prevented even if the optical signal is added/dropped thereto/therefrom during repeated transmissions. For this reason, a gain deviation between the optical signals which correspond to the respective channels of the WDM optical signal can be suppressed by an optical communication system according to the present invention. According to the optical communication system of the present invention, it is possible to prevent an optical SNR from degrading due to decrease of the channel number even with a small wavelength multiplexing number.

Next, another embodiment will be explained.
(Structure of a Second Embodiment)

The second embodiment is an embodiment of an optical communication system according to the present invention.

FIG. 1 is a view showing the structure of the optical communication system according to the second embodiment.

Figure 2:
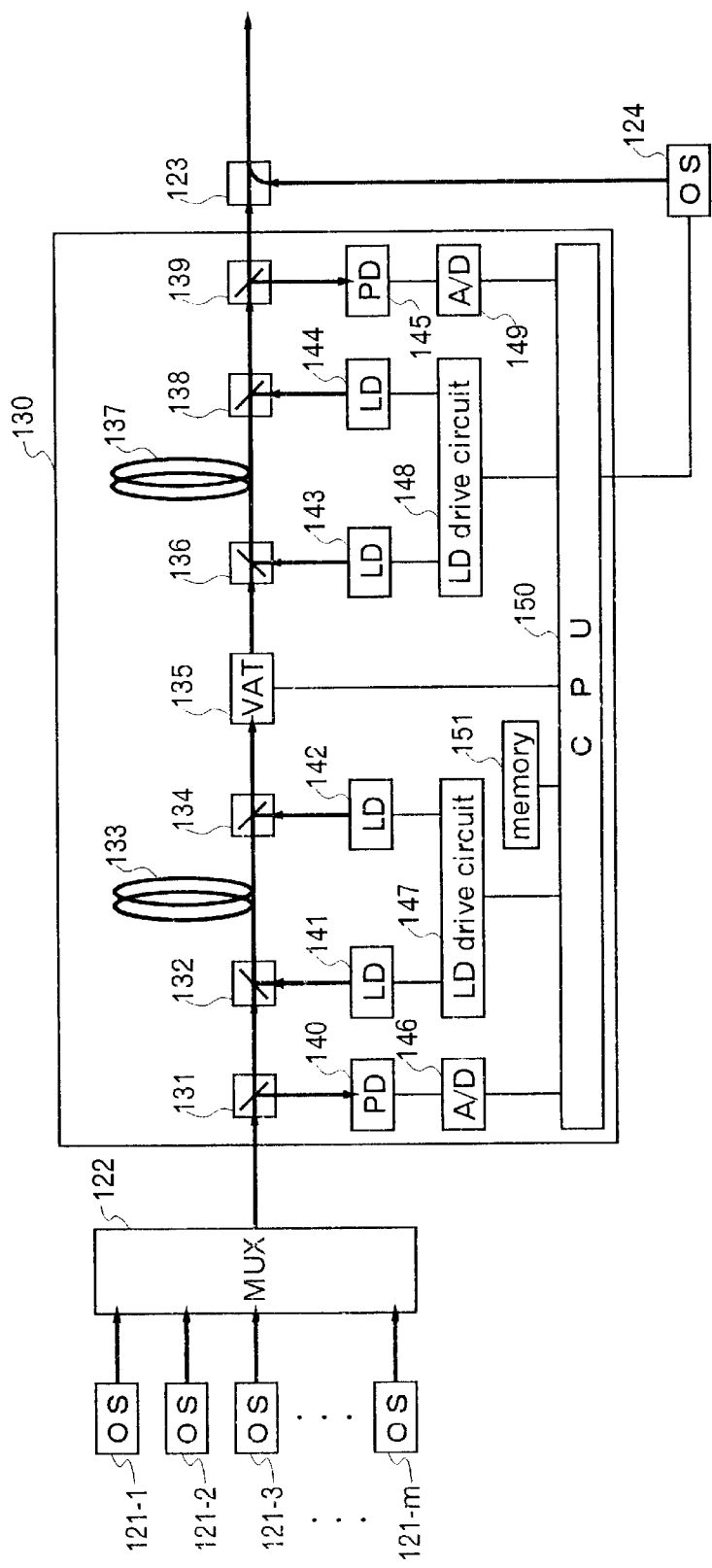
FIG. 2 is a view showing the structure of an optical transmitting station in the optical communication system according to the second embodiment.

FIG. 2 is a view showing the structure of an optical transmitting station in the optical communication system according to the second embodiment.

Figure 3:
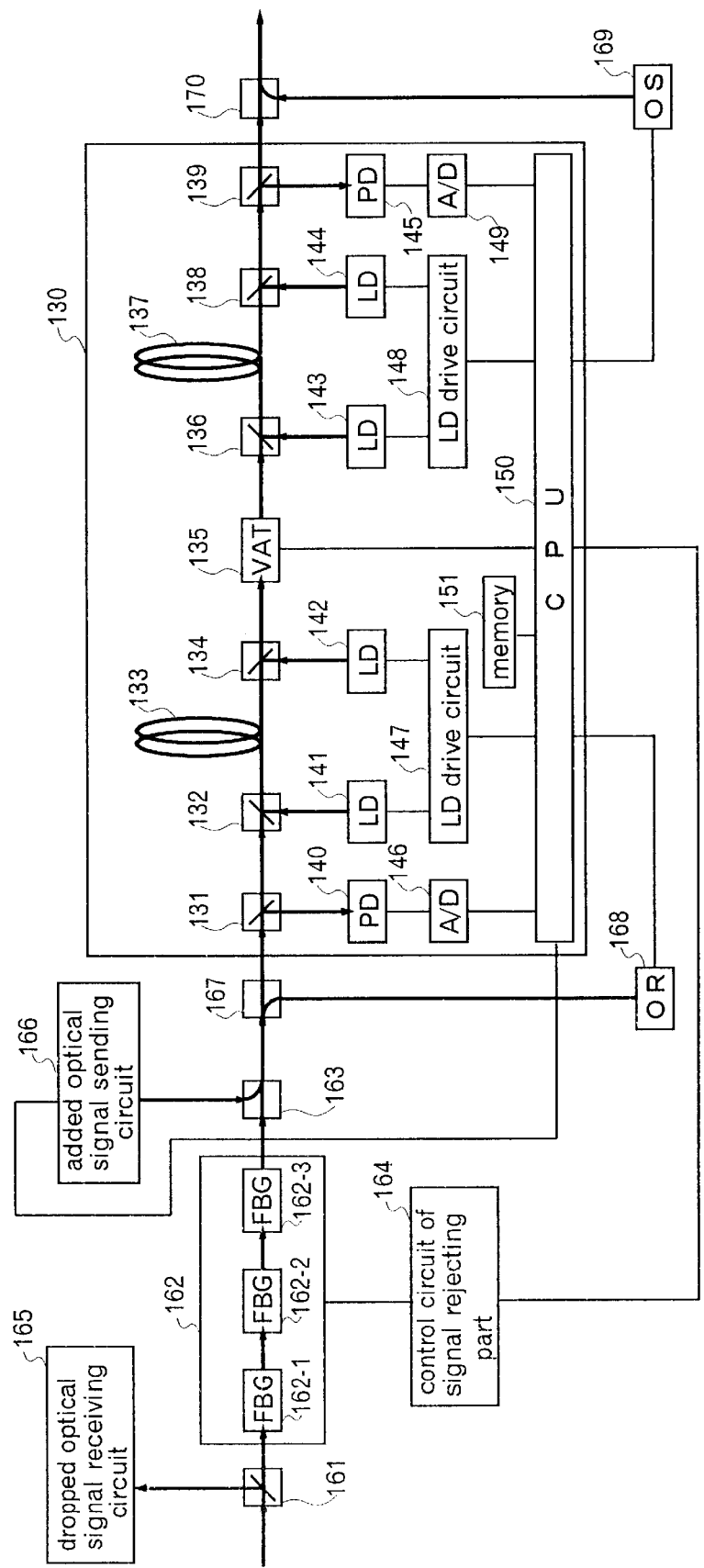
FIG. 3 is a view showing the structure of an optical repeater station in the optical communication system according to the second embodiment.

FIG. 3 is a view showing an optical repeater station in the optical communication system according to the second embodiment.

Figure 4:
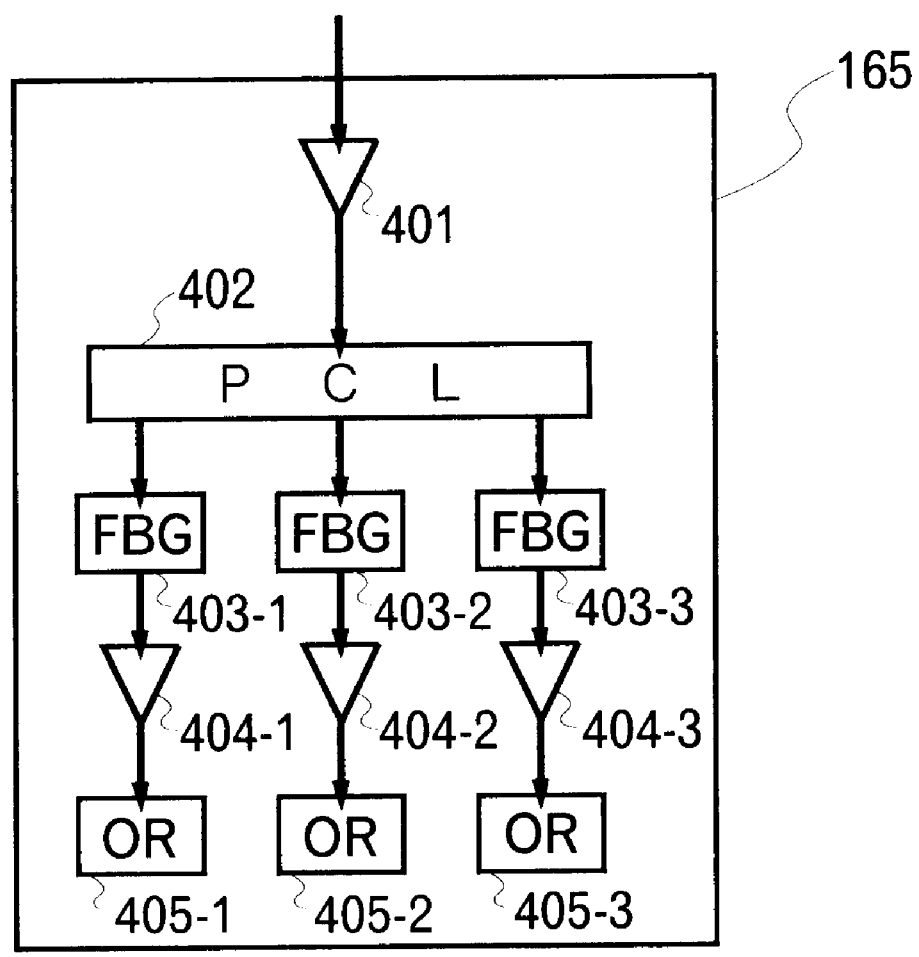
FIG. 4 is a view showing the structure of a dropped optical signal receiving circuit in the optical repeater station according to the second embodiment.

FIG. 4 is a view showing the structure of a dropped optical signal receiving circuit in the optical repeater station according to the second embodiment.

Figure 5:
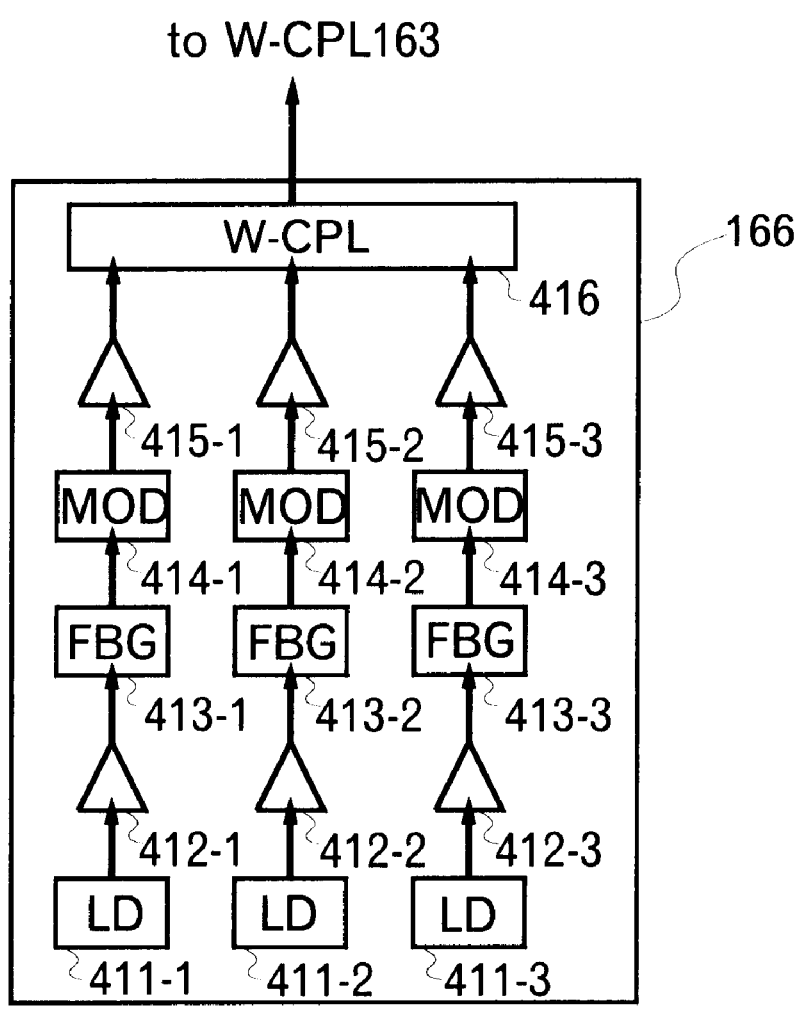
FIG. 5 is a view showing the structure of an added optical signal sending circuit in the optical repeater station according to the second embodiment.

FIG. 5 is a view showing the structure of an added optical signal sending circuit in the optical repeater station according to the second embodiment.

Figure 6:
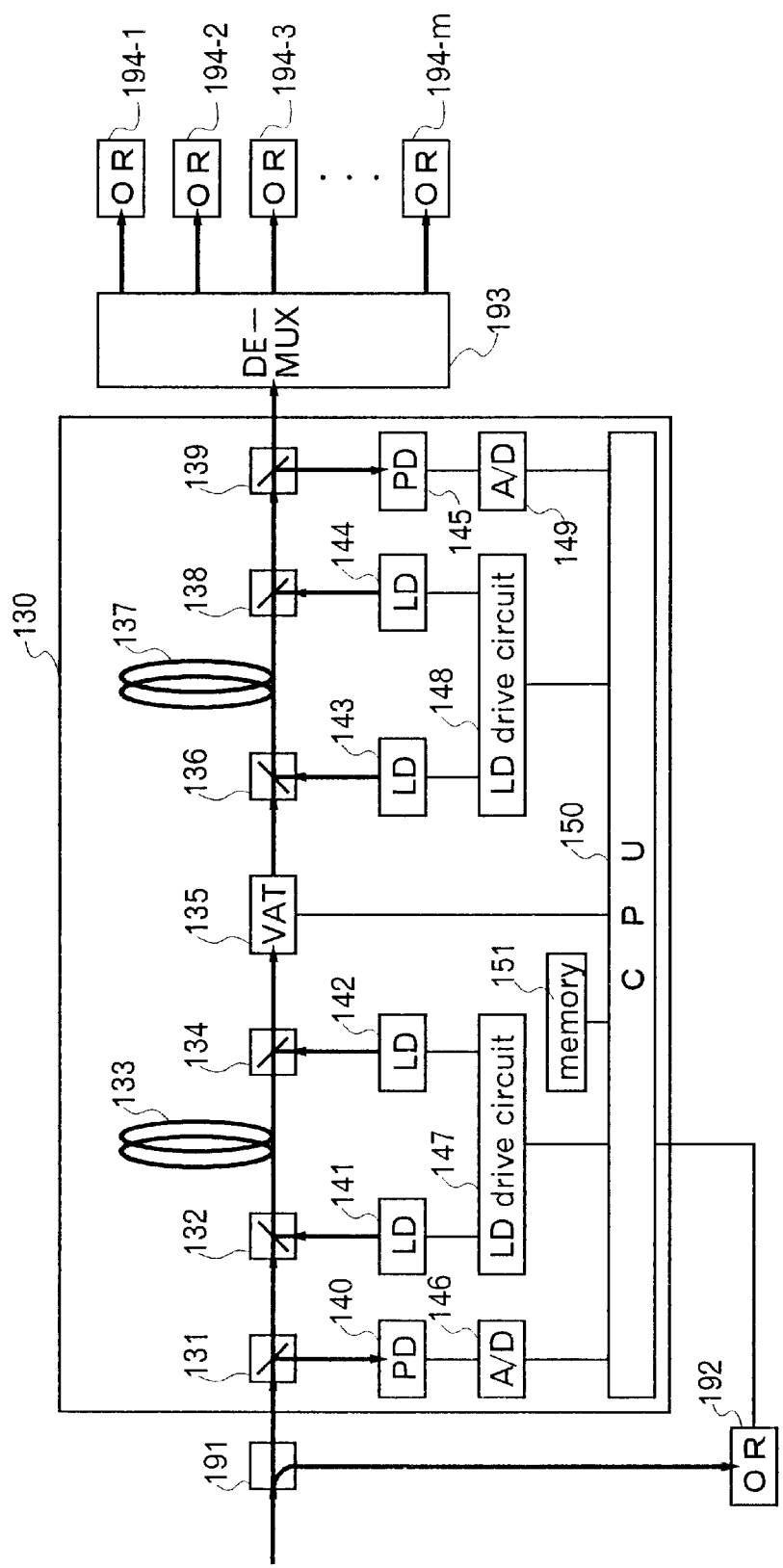
FIG. 6 is a view showing the structure of an optical receiving station in the optical communication system according to the second embodiment.

FIG. 6 is a view showing the structure of an optical receiving station in the optical communication system according to the second embodiment.

As in FIG. 1, the optical communication system is structured by including an optical transmitting station 101 which generates a WDM optical signal with a plurality of waves in the number of m, an optical transmission line 102 through which the WDM optical signal outputted from the optical transmitting station 101 is transmitted, and an optical receiving station 103 into which the transmitted WDM optical signal is inputted to be received and processed. Moreover, in the optical communication system, optical repeater stations 104 are connected in the optical transmission line 102. A plurality of the optical repeater stations 104 are provided in the optical transmission line 102 as necessary, and each optical repeater station 104 has an optical amplifying function for amplifying the WDM optical signal to a predetermined optical level in order to compensate transmission loss which occurs in the optical transmission line 102 and an OADM function for adding/dropping an optical signal which corresponds to a predetermined channel to/from the WDM optical signal.

The optical transmission line 102 is, for example, an optical fiber, and various optical fibers such as a 1.3 μm band zero dispersion single mode fiber and a 1.5μ band dispersion shift fiber can be used.

Next, the structure of the optical transmitting station 101 will be explained.

As in FIG. 2, the optical transmitting station 101 is structured by including a plurality of OSs 121-1 to 121-m in the number of m, each of which generates an optical signal corresponding to respective channels of the WDM optical signal, an MUX 122 which multiplexes the wavelengths of the respective optical signals outputted from the OSs 122-1 to 121-m, an optical amplifying part 130 which amplifies the WDM optical signal outputted from the MUX 122, an OS 124 which generates an optical signal of supervisory information, and a WDM coupler (hereinafter abbreviated to "W-CPL") 123 which multiplexes the wavelength of the optical signal of the supervisory information to that of the WDM optical signal outputted from the optical amplifying part 130.

The OS 121 can be structured by including, for example, a semiconductor laser from which laser light with a predetermined wavelength is oscillated and an external modulator such as a Mach-Zehnder interferometer type optical modulator which modulates the laser light by information to be sent. An oscillation wavelength of the semiconductor laser is set corresponding to the respective channels. The number of the OSs 121 corresponds to a channel number of the WDM optical signal. This applies to a number of optical receivers 194 which will be described later.

As the MUX 122, for example, a dielectric multilayered film filter which is one of interference filters, an arrayed waveguide grating and the like can be used.

The respective optical signals which are generated in the OSs 121-1 to 121-$m$ are wavelength-multiplexed in the MUX 122 and inputted as a WDM optical signal into an optical coupler (hereinafter abbreviated to "CPL") 131 in the optical amplifying part 130.

Next, the structure of the optical amplifying part 130 will be explained.

The WDM optical signal which is made incident on the optical amplifying part 130 is divided into two in the CPL 131. The CPL 131 is an optical component which divides the incident light into two and outputs these, which will apply to the other CPLs as will be described later. As the CPL, for example, a microoptic optical coupler such as a half mirror, an optical fiber type optical coupler of a fused fiber, an optical waveguide type optical coupler and the like can be used.

One of the WDM optical signals which are divided in the CPL 131 is inputted into a PD 140, and the other is inputted into a CPL 132.

The PD 140 is a photoelectric converter which generates a current corresponding to optical power of the received light, which will apply to the other PDs as will be described later. An output from the PD 140 is inputted into an analog/digital converter (hereinafter abbreviated to "A/D") 146 which converts an analog signal into a digital signal. An output from the A/D 146 is inputted into a central processing unit (hereinafter abbreviated to "CPU") 150 such as a microprocessor which carries out an operation.

Meanwhile, laser light which is outputted from a laser diode (hereinafter abbreviated to "LD") 141 is also inputted into the CPL 132 as pump light of an erbium-doped optical fiber (hereinafter abbreviated to "EDF") 133. As the LD 141, for example, various semiconductor lasers such as a Fabry-Perot semiconductor laser, a distributed feedback laser, a distributed Bragg-reflection type laser and the like can be used. This applies to the other LDs as will be described later.

The WDM optical signal which is outputted from the CPL 131 and the laser light which is outputted from the LD 141 are multiplexed in the CPL 132 and thereafter, inputted into the EDF 133. The erbium element is one of rare earth elements of lanthanoid, whose elemental symbol is Er and atomic number is 68. The properties of the elements which belong to the lanthanoid are similar to each other.

Incidentally, in this embodiment, an optical fiber amplifier doped with the erbium element is used as the optical fiber amplifier, but the rare earth element is selected according to an amplification band of the optical amplifying part 130. As the rare earth elements which amplify the other bands, for example, neodymium (Nd), praseodymium (Pr), thulium (Tm) and the like are known.

Moreover, laser light which is outputted from an LD 142 is inputted through a CPL 134 to the other end of the EDF 133.

The EDF 133 absorbs the laser lights outputted from the LD 141 and the LD 142, whereby erbium ions in the EDF 133 are excited to form an inverted population. When the WDM optical signal is inputted into the EDF 133 in which the inverted population is formed, induced radiation is caused in the EDF 133 by the WDM optical signal to amplify the WDM optical signal. Thus, the LDs 141, 142 are pump light sources of the EDF 133, and hence oscillation wavelengths thereof are set to excitation wavelengths of the EDF 133, for example, 1480 nm, 980 nm and so on.

Further, an LD drive circuit 147 outputs control signals to the LD 141 and the LD 142, respectively. The LD drive circuit 147 adjusts element temperature of the LDs 141, 142 to stabilize the oscillation wavelengths of the laser lights, and adjusts drive currents of the LDs 141, 142 to control optical powers of the laser lights.

An optical fiber amplifier on a first stage is structured by including the EDF 133, the CPLs 132, 134, the LDs 141, 142 and the LD drive circuit 147. A gain of the optical fiber amplifier on the first stage is controlled to a predetermined value by adjusting the optical powers of the laser lights from the LDs 141, 142.

The WDM optical signal which is amplified in the EDF 133 is inputted into an optical variable attenuator (hereinafter abbreviated to "VAT") 135 through the CPL 134.

The VAT 135 is an optical component which attenuates the inputted light and outputs it, and further, it can change its attenuation. As the VAT 135, for example, an optical variable attenuator in which an attenuation disc is inserted between input light and output light and a metallic attenuation film is deposited on a surface of the attenuation disc with its thickness varying successively in its rotating direction, for adjusting attenuation by rotating the attenuation disc, an optical variable attenuator in which a magnetooptic crystal is inserted between the input light and the output light and a polarizer is inserted to the magnetooptic crystal in its output side, for adjusting the attenuation by impressing a magnetic field to the magnetooptic crystal and changing the intensity of the magnetic field and the like can be used.

The attenuation of the VAT 135 is set by the CPU 150 so that a predetermined output (a reference output value before an output correction) which is set when the optical amplifying part 130 is installed in the optical communication system is obtained.

The WDM optical signal which is adjusted to predetermined optical power in the VAT 135 is inputted into a CPL 136 in an optical fiber amplifier on a second stage, amplified and outputted from a CPL 138.

The optical fiber amplifier on the second stage includes an EDF 137, CPLs 136, 138, LDs 143, 144 and an LD drive circuit 148. Since the structure thereof is the same with that of the optical fiber amplifier on the first stage, the explanation of the structure is omitted. As to relationships of the optical components of the optical fiber amplifier on the second stage and the optical fiber amplifier on the first stage, the CPL 136 corresponds to the CPL 132, the EDF 137 corresponds to the EDF 133, the CPL 138 corresponds to the CPL 134, the LD 143 corresponds to the LD 141, the LD 144 corresponds to the LD 142, and the LD drive circuit 148 corresponds to the LD drive circuit 147. A gain of the optical fiber amplifier on the second stage is controlled to a predetermined value by adjusting optical powers of laser lights from the LDs 143, 144.

The WDM optical signal outputted from the CPL 138 is inputted into a CPL 139. The WDM optical signal is divided in the CPL 139 and one of these is inputted into the W-CPL 123 and the other is inputted into a PD 145.

An output which corresponds to optical power of the received light is inputted from the PD 145 to an A/D 149. An output from the A/D 149 is inputted into the CPU 150.

Meanwhile, the OS 124 is structured similarly to the OS 121 and generates an optical signal which is modulated according to the supervisory information (hereinafter abbreviated to "OSC"). The supervisory information includes maintenance information and status information, which is necessary for operating the optical communication system. The OSC is set in a shorter wavelength side than a ch. 1 which is a minimum channel of the WDM optical signal. Incidentally, the OSC may be set in a longer wavelength side than a ch. m which is a maximum channel of the WDM optical signal.

The OSC which is generated in the OS 124 is inputted into the W-CPL 123. In the W-CPL 123, the WDM optical signal which is outputted from the CPL 139 and the OSC are wavelength-multiplexed. The WDM optical signal in which the OSC is wavelength-multiplexed is sent out as an output from the optical transmitting station 101 to an optical transmission line 102-1 to be transmitted to an optical repeater station 104-1 on the next stage.

A memory 151 is a storage circuit such as a semiconductor memory, in which a control program which controls the optical amplifying part 130, various data during the execution of the control program, an amplification band $\Delta f$ of the optical amplifying part 130, a bandwidth of ASE $\Delta f_{ch,j}$ which is rejected in order to drop an optical signal of one channel, a noise figure $NF_k$ of the optical amplifying part on a k-stage in the case that the optical amplifying part 130 is the optical amplifying part on the k-stage, a spontaneous emission coefficient $n_{spk}$ of the optical amplifying part and the like are stored.

The CPU 150 is connected to the A/Ds 146, 149, the LD drive circuits 147, 148, the memory 151 and the OS 124, and sends/receives the signal to/from the respective circuits.

Incidentally, an optical isolator may be provided at any point from the CPL 131 to the CPL 139 in the optical amplifying part 130. For example, it may be provided between the EDF 133 and the CPL 134, or between the EDF 137 and the CPL 138. The optical isolator is an optical component which passes light therethrough only in one direction, and it can be structured, for example, by disposing a Faraday rotator between two polarizers which are deviated by 45 degrees from each other. The optical isolator prevents light which is reflected by, for example, a connecting part of respective optical components in the optical amplifying part 130 from being propagated to the end. Particularly, when the reflected light is returned to the semiconductor laser, the semiconductor laser is induced by the reflected light with various phases and amplitudes, whereby its oscillation mode is changed and a noise is generated. These adverse effects can be prevented by the optical isolator.

Next, the structure of the optical repeater station 104 will be explained.

As in FIG. 3, the optical repeater station 104 is structured by including a CPL 161, an optical signal rejecting part 162, a control circuit of the signal rejecting part 164, W-CPLs 163, 167, 170, a dropped optical signal receiving circuit 165, an added optical signal sending circuit 166, an optical amplifying part 130, an OR 168 and an OS 169.

The WDM optical signal is divided in the CPL 161 and one of these is inputted into the optical signal rejecting part 162 and the other is inputted into the dropped optical signal receiving circuit 165.

The optical signal rejecting part 162 is an optical component for rejecting the optical signal from the WDM optical signal, which corresponds to a channel dropped in the optical repeater station 104. The optical signal rejecting part 162 is structured by optical filters, for example, fiber grating filters (hereinafter abbreviated to "FBG") 162 in the number corresponding to a channel number to be dropped, being cascaded. Pass wavelength bands of FBGs 162-1 to 162-3 are respectively set to the wavelengths of the channels which are dropped therefrom. Thus, the optical signals which correspond to the channels to be dropped is rejected from the WDM optical signal. For example, when a ch. 4 to a ch. 6 are dropped from a 32-wave WDM optical signal, the pass wavelength band of the FBG 162-1 is set to the wavelength of the ch. 4, the pass wavelength band of the FBG 162-2 is set to the wavelength of the ch. 5, and the pass wavelength band of the FBG 162-3 is set to the wavelength of the ch. 6.

The bandwidth which is filtered by the FBG 162 corresponds to the aforesaid bandwidth of the ASE $\Delta f_{ch}$.

The control circuit 164 of the signal rejecting part notifies a CPU 150 in the optical amplifying part 130 of information about the channel which is rejected in the optical signal rejecting part 162. Taking the above example as an example, the information that the ch. 4 to the ch. 6 are rejected and added is notified to the CPU 150.

Incidentally, the optical signal rejecting part 162 is structured by cascading the optical filters, but it is also suitable to use an acoustic-optic tunable filter (hereinafter abbreviated to "AOTF"). The AOTF is an optical component which induces a refractive index change in an optical waveguide by an acoustic-optic effect, and rotates a polarization state of light propagating through the optical waveguide, whereby the wavelength is separated/selected. For example, in the AOTF, two optical waveguides are formed on a substrate which is a piezoelectric crystal. The optical waveguides cross each other at two points and polarization beam splitters are provided at the crossing points. Between the two crossing points, electrodes which generate surface acoustic waves on the two optical waveguides are formed on the two optical waveguides. The surface acoustic wave is generated by supplying an RF frequency to the electrodes, which changes refractive indexes of the two optical waveguides. The wavelength to be separated/selected is decided by controlling the RF frequency, and when the plurality of the wavelengths are separated/selected, the plurality of the RF frequencies which correspond thereto are supplied to the electrodes.

Back in FIG. 3, the WDM optical signal from which the ASE and the optical signal corresponding to the dropped channel are rejected in the optical signal rejecting part 162 is inputted into the W-CPL 163, in which an optical signal is newly added thereto by being multiplexed with the wavelength of the optical signal generated in the added optical signal sending circuit 166, and it is inputted into the W-CPL 167.

In the W-CPL 167, the wavelengths of the OSC and the WDM optical signal are demultiplexed, and the OSC is outputted to the OR 168 and the WDM optical signal is outputted to a CPL 131 in the optical amplifying part 130. Namely, a cutoff wavelength of the W-CPL 167 is set between the wavelength of the OSC and the wavelength band of the WDM optical signal. The OR 168 receives and processes the OSC, removes the supervisory information from the OSC and notifies the CPU 150 of the supervisory information.

The structure of the optical amplifying part 130 is the same with that of the optical amplifying part 130 in the optical transmitting station 101 except that the CPU 150 receives the output from the control circuit 164 of the signal rejecting part, the output from the added optical signal sending circuit 166, and the output from the OR 168, and hence its explanation is omitted.

The WDM optical signal which is amplified to a predetermined level in the optical amplifying part 130 is inputted into the W-CPL 170.

Moreover, the OS 169 is structured similarly to the OS 121, and generates an OSC which is modulated by the supervisory information changed by a processing of the optical repeater station 104. The OSC which is generated in the OS 169 is inputted into the W-CPL 170. In the W-CPL 170, the WDM optical signal which is outputted from the CPL 139 and the OSC are wavelength-multiplexed. The WDM optical signal in which the OSC is wavelength-multiplexed is sent out as an output from the optical repeater station 104-1 to an optical transmission line 102-2 to be transmitted to an optical repeater station 104-2 on the next stage. Further, the optical repeater station 104-2 is structured similarly to the optical repeater station 104-1, in which an optical signal which corresponds to a predetermined channel is dropped/added from/to the WDM optical signal, and sent out to an optical transmission line 102-3 to be transmitted to an optical repeater station 104-3 on the next stage.

Thus, in the optical communication system of the second embodiment, the WDM optical signal from the optical transmitting station 101 is repeated in sequence through the plurality of the repeater stations 104, and received in the optical receiving station 103.

The dropped optical signal receiving circuit 165 receives/processes the optical signal which corresponds to the predetermined channel in the WDM optical signal which is divided in the CPL 161. The receiving and processing are to demodulate the optical signal which corresponds to the predetermined channel to remove the information, and to send the optical signal out to a network when the optical repeater station 104 is connected to the other network.

Here, an example of the dropped optical signal receiving circuit 165 is explained based on FIG. 4.

As in FIG. 4, the WDM optical signal which is outputted from the CPL 161 is amplified in an optical amplifier 401 and divided into three in a CPL 402. The divided WDM optical signals are respectively inputted into ORs 405-1 to 405-3 through FBGs 403-1 to 403-3 and optical amplifiers 404-1 to 404-3. Pass wavelength bands of the FBGs 403-1 to 403-3 are respectively set to the wavelengths of the channels to be dropped, whereby the respective ORs 405-1 to 405-3 can receive the optical signals which correspond to the predetermined channels. For example, when the ch. 4 to the ch. 6 are dropped from the 32-wave WDM optical signal, the pass wavelength band of the FBG 403-1 is set to the wavelength of the ch. 4, the pass wavelength band of the FBG 403-2 is set to the wavelength of the ch. 5, and the pass wavelength band of the FBG 403-3 is set to the wavelength of the ch. 6.

Meanwhile, the added optical signal sending circuit 166 generates the optical signal which corresponds to the channel to be added in the optical repeater station 104. It is not necessary that its number equals the dropped channel number, and it may be the same with or smaller than that. The added optical signal sending circuit 166 notifies the CPU 150 of the added channel number.

Here, an example of the added optical signal sending circuit 166 is explained based on FIG. 5.

As in FIG. 5, laser light having a wavelength corresponding to the channel to be added is oscillated by each of LDs 411-1 to 411-3. The laser lights are respectively inputted into optical modulators (hereinafter abbreviated to "MOD") 414-1 to 414-3 through optical amplifiers 412-1 to 412-3 and FBGs 413-1 to 413-3. Pass wavelength bands of the FBGs 413-1 to 413-3 are respectively set to the wavelengths of the channels to be added. The respective laser lights are modulated by information to be sent out in the MODs 414-1 to 414-3, passing through optical amplifiers 415-1 to 415-3, these wavelengths multiplexed in a W-CPL 416 and sent out to the W-CPL 163. As the MOD 414, for example, an external modulator type modulator, such as the Mach-Zehnder interferometer type optical modulator, a semiconductor electric field absorption type modulator and the like can be used. In thus-structured added optical signal sending circuit 166, a supervisory control circuit which supervises the states of operation of the MODs 414-1 to 414-3 is provided, and the supervisory control circuit counts the channel number to be added and notifies the CPU 150 in the optical amplifying part 130 of the result of the count.

Incidentally, the channel number to be dropped and the channel number to be added can be any numbers. In this case, an additional unit which comprises the aforesaid CPL 402, FBGs 403-1 to 403-3, the optical amplifiers 404-1 to 404-3, and the OR 405-1 is installed corresponding to the channel number to be dropped, and a CPL which distributes the WDM optical signal outputted from the optical amplifier 401 to the respective units is installed. Accordingly, an additional unit which comprises the aforesaid LDs 411-1 to 411-3, the optical amplifiers 412-1 to 412-3, FBGs 413-1 to 413-3, the MODs 414-1 to 414-3, the optical amplifiers 415-1 to 415-3, and the W-CPL 416 is installed, and outputs from the respective units are subjected to the wavelength multiplexing in the W-CPL and inputted into the W-CPL 163.

Next, the structure of the optical receiving station 103 will be explained.

As in FIG. 6, the optical receiving station 103 is structured by including a W-CPL 191, an OR 192, an optical amplifying part 130, a DEMUX 193 and ORs 194-1 to 194-*m*.

The WDM optical signal which is transmitted through the optical transmission line 102 to the optical receiving station 103 is inputted into the W-CPL 191. The W-CPL 191 demultiplexes the wavelengths of the OSC and the WDM optical signal, and outputs the OSC to the OR 192 and the WDM optical signal to a CPL 131 in the optical amplifying part 130. The OR 192 receives and processes the OSC, removes the supervisory information from the OSC and notifies a CPU 150 of the supervisory information.

The structure of the optical amplifying part 130 is the same with that of the optical amplifying part 130 in the optical transmitting station 101 except that the CPU 150 receives an output from the OR 192, and hence its explanation is omitted.

The WDM optical signal which is amplified in the optical amplifying part 130 to a predetermined level is inputted into the DEMUX 193. The DEMUX 193 demultiplexes the wavelength of the WDM optical signal by the optical signal corresponding to each respective channel. The demultiplexed optical signals of the respective channels are respectively inputted into the ORs 194-1 to 194-*m* to be received and processed therein. The OR 194 is structured by including, for example, a photodetector part such as a photodiode, an equalization amplifier which equalizes an output from the photodetector part, a timing circuit which extracts a timing from an output from the equalization amplifier, and a recognition circuit which removes a signal from the output from the equalization amplifier in the timing of the timing circuit.

(Operation and Effects of the Second Embodiment)

The optical transmitting station 101 according to the second embodiment generates the WDM optical signal with the predetermined channel number by the OSs 121-1 to 121-$m$ and the MUX 122. The CPU 150 of the optical transmitting station 101 allows the OS 124 to generate the OSC which accommodates the supervisory information including a multiplexing number $m_0$ of the WDM optical signal and accumulated ASE information $d_0$. The wavelength of the generated OSC is multiplexed to that of the WDM optical signal in the W-CPL 123 to be transmitted to the optical repeater station 104-1 on the next stage. Incidentally, the optical amplifying part 130 of the optical transmitting station 101 is set to an optical amplifying part on a 0-stage.

The WDM optical signal is repeated in sequence through the optical repeater stations 104 cascaded in multiple stages, in which the optical signal corresponding to the predetermined channel is added/dropped thereto/therefrom and the WDM optical signal is amplified, to be transmitted to the optical receiving station 103. Since the operations of the respective optical repeater stations 104 are the same with each other, the operation of an optical repeater station 104-$k$ on the k-stage out of these will be hereinafter explained.

In the optical repeater station 104-$k$, the WDM optical signal which is inputted from the optical transmission line 102 is divided in the CPL 161, and the optical signal corresponding to the predetermined channel is rejected from the WDM optical signal in the optical signal rejecting part 162. Newly added with the optical signal outputted from the added optical signal sending circuit 166, the WDM optical signal which is outputted from the optical signal rejecting part 162 is outputted to the W-CPL 167. In the W-CPL 167, the wavelength of the WDM optical signal is demultiplexed, and the OSC and the WDM optical signal are outputted to the OR 168 and the optical amplifying part 130, respectively.

Next, the control of the optical amplifying part 130 will be explained.

In the following explanation, the respective numerals and symbols are defined as follows.

"$d_k$" is optical power of the ASE which is accumulated up to the optical amplifying part on the k-stage (accumulated ASE information).

"$m_k$" is a channel number of the WDM optical signal which is inputted into the optical amplifying part on the k-stage (input channel number).

"n" is a number of the channel which is dropped between an optical amplifying part on a k–1-stage and the optical amplifying part on the k-stage (dropped channel number).

"s" is a number of the channel which is added between the optical amplifying part on the k–1-stage and the optical amplifying part on the k-stage (added channel number).

"$P_{Tink}$" is total input power of light which is inputted into the optical amplifying part on the k-stage.

"$P_{outk}$" is total output power of light which is outputted from the optical amplifying part on the k-stage.

"$P_{ink}$" is input optical power per channel in the optical amplifying part on the k-stage.

"$NF_k$" is a noise figure of the optical amplifying part on the k-stage.

"$\Delta f$" is an amplification band of the optical amplifying part.

"$\Delta f_{Ch.}$" is a bandwidth of the ASE which is rejected corresponding to the rejection of one channel (ASE rejected band).

"$C_k$" is the ASE which is generated in the optical amplifying part on the k-stage (ASE information).

"$\Delta_k$" is an output correction amount of the optical amplifying part on the k-stage.

Figure 7:
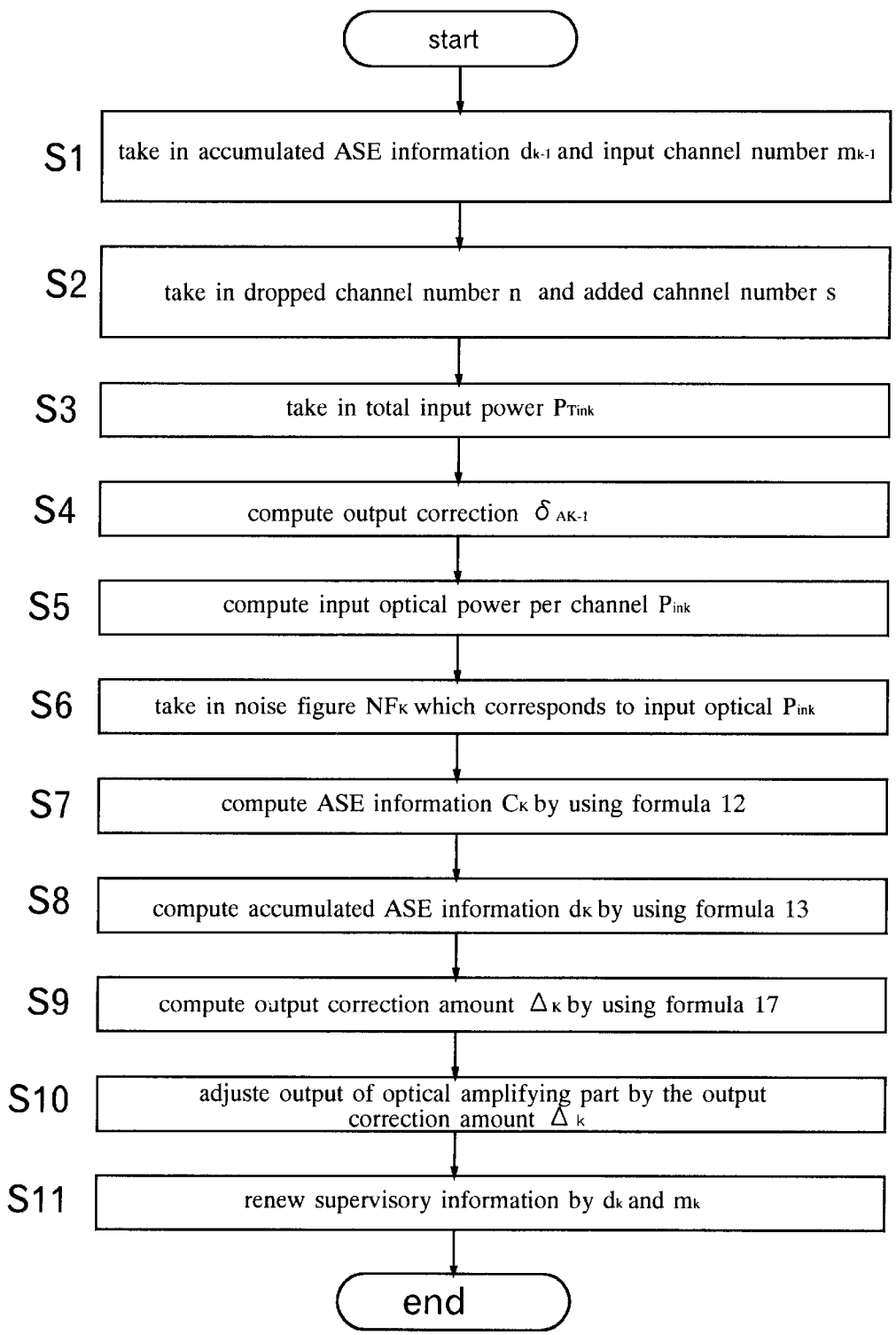
FIG. 7 is a flow chart explaining the control performed in an optical amplifying part according to the second embodiment.

FIG. 7 is a flow chart for the control in the optical amplifying part of the optical repeater station according to the second embodiment.

The CPU 150 of the optical amplifying part 130 takes in accumulated ASE information $d_{k-1}$ and an input channel number $m_{k-1}$ from the output of the OR 168 (S1).

The CPU 150 takes in the dropped channel number (rejected channel number) n from the output of the control circuit 164 of the signal rejecting part, and takes in the added channel number s from the added optical signal sending circuit 166 (S2).

The CPU 150 takes in the total input power $P_{Tink}$ from the output of the PD 140 which is inputted through the A/D 146 (S3).

The CPU 150 computes an output correction amount $\delta_{Ak-1}$ of the optical amplifying part on the k–1-stage as the preceding stage, by assuming that the WDM optical signal with the channel number $m_k$ is inputted into the optical amplifying part on the k–1 stage (S4).

The CPU 150 computes the input channel number $m_k$ of the optical amplifying part on the k-stage from the input channel number $m_{k-1}$, the dropped channel number n and the added channel number s, and computes the input optical power per channel $P_{ink}$ from the total input power $P_{Tink}$ and the input channel number $m_k$ (S5).

Referring to the memory 151, the CPU 150 takes in the noise figure $NF_k$ which corresponds to the input optical power $P_{ink}$ (S6).

The CPU 150 computes the ASE information $c_k$ from the spontaneous emission coefficient $n_{spk}$ which is stored in the memory 151 and the input optical power $P_{ink}$, by using a formula 12 (S7).

The CPU 150 computes the accumulated ASE information $d_k$ from the optical amplifying part of the optical transmitting station 101 to the optical amplifying part of the optical repeater station 104-$k$ on the k-stage, from the spontaneous emission coefficient $n_{spk}$ and the input optical power $P_{ink}$, by using a formula 13 (S8). Incidentally, in this embodiment, the spontaneous emission coefficient $n_{spk}$ and the input optical power $P_{ink}$ in the optical amplifying parts of the respective stations are set to be the same with each other.

When the noise figure $NF_k$ which is taken therein in S6 is used, instead of the spontaneous emission coefficient $n_{spk}$, it is also possible to compute $c_k$ and $d_k$ from a formula 14. Further, $d_k$ can be computed from $d_{k-1}$ and $c_k$ which are obtained from the output of the OR 168 in S1, from the formula 12 and the formula 13.

The CPU 150 computes the output correction amount $\Delta_k$ from the values which are computed in the above steps, by using a formula 17 (S9).

The CPU 150 adjusts the attenuation of the VAT 135 so that the set attenuation is obtained. The CPU 150 adjusts a gain of the EDF 133 and a gain of the EDF 137 to obtain the output correction amount $\Delta_k$ while monitoring the output of the PD 145 which is inputted through the A/D 149 (S10). Incidentally, the gains may be adjusted by, for example, fixing one of the gains to a predetermined value and fine-tuning the other. Further, the gain of the EDF 133 is changed by adjusting the outputs of the LDs 141, 142 through the LD drive circuit 147, and the gain of the EDF 137 is changed by adjusting the outputs of the LDs 143, 144 through the LD drive circuit 148.

The CPU 150 renews the supervisory information by the accumulated ASE information dof the optical repeater station 104-$k$ and the input channel number $m_k$, and allows the OS 169 to generate the OSC based on the renewed supervisory information (S11). The generated OSC and the WDM optical signal which is amplified by a level corrected by the output correction amount $\Delta_k$ are wavelength-multiplexed in the W-CPL 170 to be sent out to the optical transmission line 102.

Thus, in the optical repeater station 104-$k$, the output is corrected by the correction amount with consideration of the power of the rejected ASE.

The WDM optical signal which is repeated in sequence is inputted into the optical receiving station 103 and amplified by the level corrected by the output correction amount in the optical amplifying part 130 in the optical receiving station 103, similarly to the repeating station 104-$k$. The wavelength of the amplified WDM optical signal is demultiplexed in the DEMUX 193 by the optical signal corresponding to each channel, and the respective optical signals are received/processed in the ORs 194-1 to 194-$m$.

FIG. 8 are views showing simulation results of the optical communication system according to the second embodiment.

In the simulation, the 32-wave WDM optical signal can be transmitted through the optical communication system, the number of the optical repeater stations 104 is five, and the channels of the WDM optical signal are dropped/added therefrom/thereto in the respective stations as follows. The optical transmitting station 101 generates a WDM optical signal with a ch. 1 to a ch. 8 and a ch. 32, and transmits it to the optical repeater station 104-1. The optical repeater station 104-1 drops the ch. 1 to the ch. 8 therefrom and adds a ch. 9 to a ch. 16 thereto, and transmits it to the optical repeater station 104-2. The optical repeater station 104-2 drops the ch. 9 to the ch. 16 therefrom and adds a ch. 17 to a ch. 24 thereto, and transmits it to the optical repeater station 104-3. The optical repeater station 104-3 drops the ch. 17 to the ch. 24 therefrom and adds the ch. 1 and a ch. 25 to a ch. 31 thereto, and transmits it to the optical repeater station 104-4. The optical repeater station 104-4 drops the ch. 25 to the ch. 32 therefrom and adds the ch. 2 to the ch. 8 and a ch. 32 thereto, and transmits it to the optical repeater station 104-5. The optical repeater station 104-5 drops the ch. 1 to the ch. 8 therefrom and transmits it to the optical receiving station 103. Loss in the optical transmission line is 25 dB between the respective stations, and an output level of the respective stations is 0 dBm/ch.

FIG. 8A is a view showing an output correction value of the optical amplifying part 130 in the respective optical repeater stations 104 and the optical receiving station 103. In FIG. 8A, a lateral axis shows the number of the optical repeater station and a vertical axis shows the optical correction amount shown in dB. A full line shows the output correction amount with consideration of the rejected ASE according the present invention, and a broken line shows the output correction amount without consideration of the rejected ASE as conventional.

Since the optical repeater station normally sends the WDM optical signal out to the optical transmission line on the verge of an occurrence of a nonlinear optical effect and a correction error reaches 1.6 dB at the maximum in the conventional art, there is a high probability of the occurrence of the nonlinear optical effect to the WDM optical signal.

However, according to the present invention, the above problems are insignificant and the nonlinear optical effect is not caused.

FIG. 8B shows a level diagram of the optical communication system.

In FIG. 8B, a lateral axis shows a number of the optical repeater station, and a vertical axis shows a level of average optical power of the channel shown in dBm/ch. ♦ shows an optical level of the optical signal with the output correction, ▲ shows an optical level of the optical signal with the output correction and the ASE being added thereto, ■ shows an optical level of the optical signal without the output correction, and × shows an optical level of the optical signal without the output correction and with the ASE being added thereto.

As is clear from the comparison between FIG. 8B and FIG. 18B, when the rejection of the ASE is taken into consideration according to the present invention, a fluctuation in the level of the average optical power of the channel which is caused during the multi-repeating is prevented. For this reason, a gain deviation between the optical signals which correspond to the respective channels of the WDM optical signal can be suppressed by an optical communication system according to the present invention. According to the optical communication system of the present invention, it is possible to prevent an optical SNR from degrading due to decrease of the channel number even with a small wavelength multiplexing number.

Incidentally, the optical repeater station 104 which has both the optical amplifying function and the OADM function is used in the second embodiment, but it is possible to use an optical repeater station 105 having the optical amplifying function only or an optical repeater station 106 having the OADM function only.

Next, the structure of the optical repeater station 105 having the optical amplifying function only will be explained.

Figure 9:
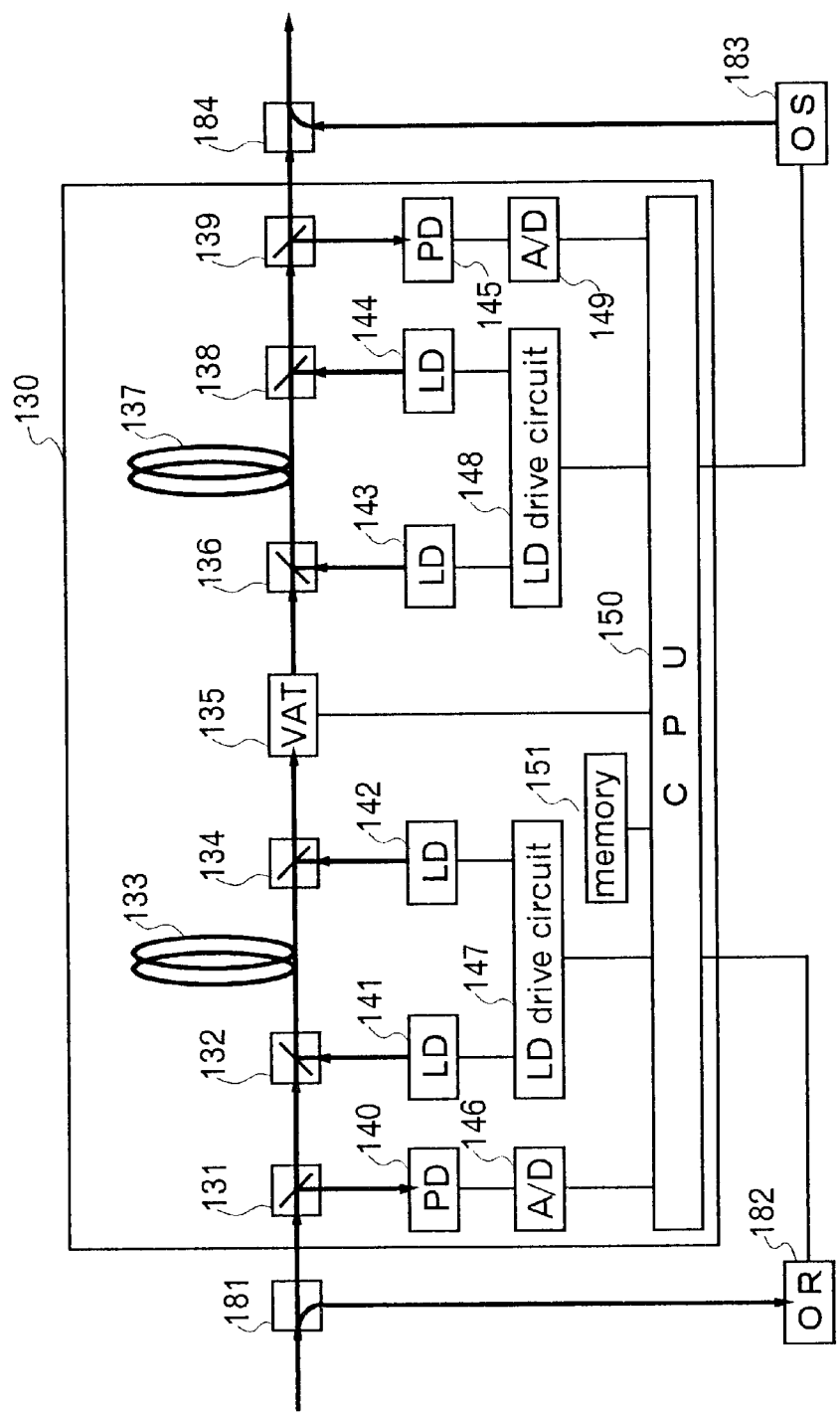
FIG. 9 is a view showing the structure of an optical repeater station (having an optical amplifying function only) in the optical communication system.

FIG. 9 is a view showing the optical repeater station (having the optical amplifying function only) in the optical communication system.

As in FIG. 9, the optical repeater station 105 is structured by including a W-CPL 181, an optical amplifying part 130, an OR 182, an OS 183 and a W-CPL 184.

The WDM optical signal which propagates through the optical transmission line 102 is inputted into the W-CPL 181.

In the W-CPL 181, its wavelength is demultiplexed to the OSC and the WDM optical signal, and the OSC is outputted to the OR 182 and the WDM optical signal is outputted to a CPL 131 in the optical amplifying part 130. The OR 182 receives and processes the OSC, removes the supervisory information from the OSC and notifies a CPU 150 of the supervisory information.

The structure of the optical amplifying part 130 is the same with that of the optical amplifying part 130 of the optical transmitting station 101 except that the CPU 150 receives an output from the OR 182, and hence its explanation is omitted.

The WDM optical signal which is amplified in the optical amplifying part 130 to a predetermined level is inputted into the W-CPL 184.

Moreover, the OS 183 is structured similarly to the OS 121, and generates an OSC which is modulated by the supervisory information renewed by a processing of the optical repeater station 105. The OSC which is generated in the OS 183 is inputted into the W-CPL 184. In the W-CPL 184, the WDM optical signal which is outputted from the CPL 139 and the OSC are wavelength-multiplexed. The WDM optical signal in which the OSC is wavelength-multiplexed thereto is sent out as an output from the optical repeater station 105 to the optical transmission line 102.

Next, the structure of the optical repeater station 106 having the OADM function only will be explained.

Figure 10:
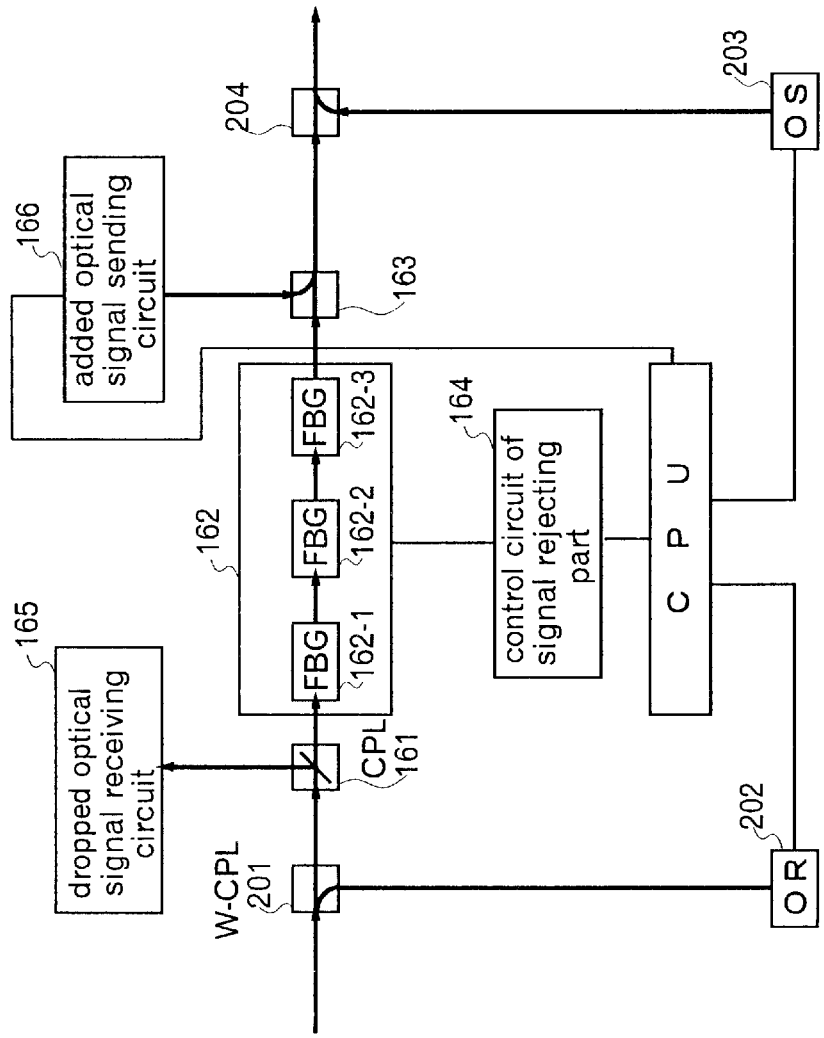
FIG. 10 is a view showing the structure of an optical repeater station (having an OADM function only) in the optical communication system.

FIG. 10 is a view showing the structure of the optical repeater station (having the OADM function only) in the optical communication system.

As in FIG. 10, the optical repeater station 106 is structured by including a W-CPL 201, a CPL 161, an optical signal rejecting part 162, a W-CPL 163, a dropped optical signal receiving circuit 165, an added optical signal sending circuit 166, a control circuit 164 of the signal rejecting part, a CPU 205, an OR 202, an OS 203 and a W-CPL 204.

The WDM optical signal which propagates through the optical transmission line 102 is inputted into the W-CPL 201.

The W-CPL 201 demultiplexes its wavelength to the OSC and the WDM optical signal, and outputs the OSC to the OR 202 and the WDM optical signal to the CPL 161. The OR 202 receives and processes the OSC, removes the supervisory information from the OSC and notifies the CPU 205 of the supervisory information.

The CPL 161 distributes the WDM optical signal to the dropped optical signal receiving circuit 165 and the optical signal rejecting part 162. The WDM optical signal which is outputted from the optical signal rejecting part 162 is multiplexed in the W-CPL 163 with the wavelength of the optical signal to be added thereto, which is from the added optical signal sending circuit 166, and inputted into the W-CPL 204.

The CPU 205 renews the supervisory information which is removed in the OR 202 by the information concerning the rejected channel, which is received from the control circuit 164 of the signal rejecting part, and outputs the renewed supervisory information to the OS 203.

The OS 203 is structured similarly to the OS 121, and generates an OSC which is modulated by the renewed supervisory information. The OSC which is generated in the OS 203 is inputted into the W-CPL 204. The W-CPL 204 wavelength-multiplexes the WDM optical signal which is outputted from the W-CPL 163 and the OSC. The WDM optical signal in which the OSC is wavelength-multiplexed is sent out as an output from the optical repeater station 106 to the optical transmission line 102.

Next, another embodiment will be explained.

(Structure of a Third Embodiment)

The third embodiment is an embodiment of an optical communication system according to the present invention.

In the third embodiment, an optical amplifying part 220 which has a function of supervising channels of a WDM optical signal is used. Namely, the optical amplifying part 220 of the third embodiment is different from the optical amplifying part 130 of the second embodiment in that it includes a CPL 221 between a CPL 131 and a CPL 132, an optical spectrum analyzer (hereinafter abbreviated to "OSA") 222 which analyzes a spectrum of the WDM optical signal dropped in the CPL 221, and an OSA control circuit 223 which controls the OSA 222.

The optical communication system according to the third embodiment is a point-to-point optical communication system which includes an optical transmitting station 101, an optical receiving station 107 which receives and processes the WDM optical signal, and an optical transmission line 102 which connects these, in which optical repeater stations 108 in the necessary number, which has an optical amplifying function and an OADM function are cascaded in the optical transmission line 102 of the optical communication system.

First, the structure of the optical repeater station 108 according to the third embodiment will be explained.

Figure 11:
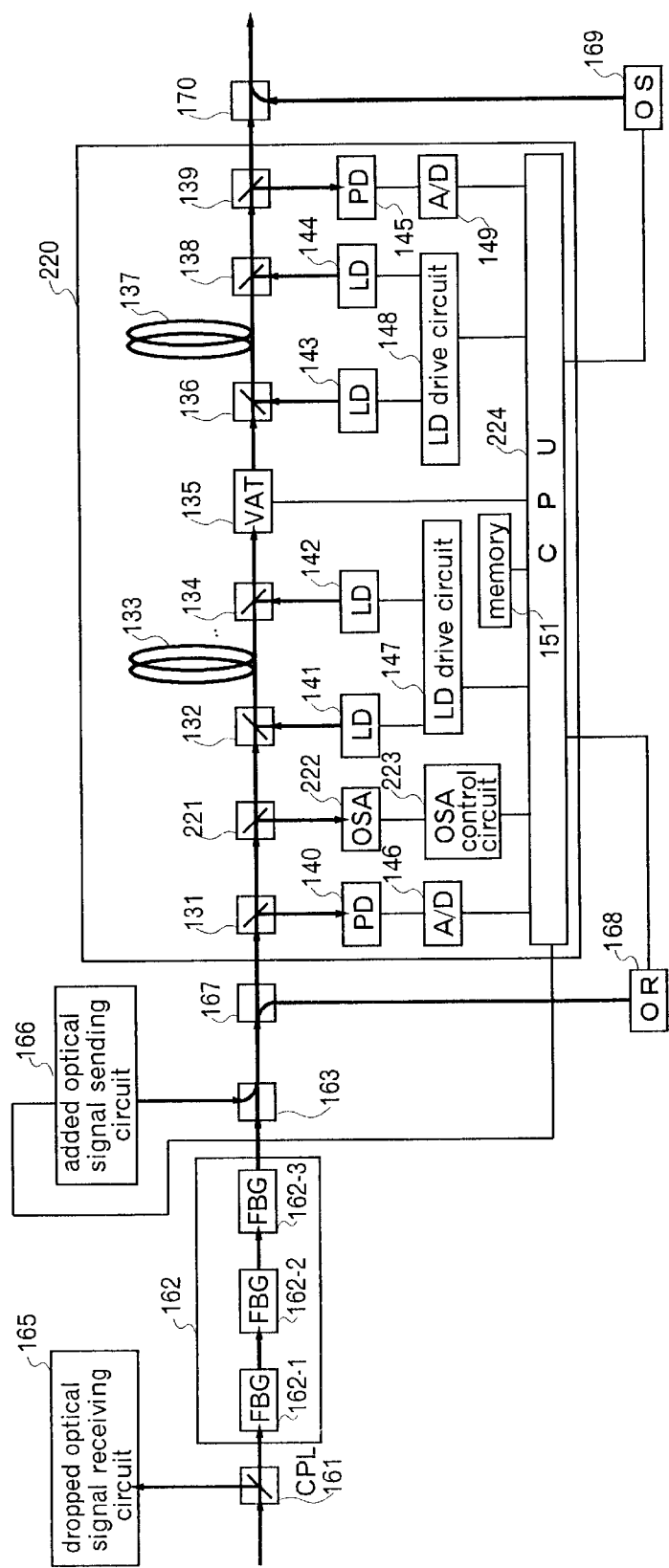
FIG. 11 is a view showing the structure of an optical repeater station in an optical communication system according to a third embodiment.

FIG. 11 is a view showing the structure of the optical repeater station in the optical communication system according to the third embodiment.

As in FIG. 11, the optical repeater station 108 is structured by including a CPL 161, an optical signal rejecting part 162, W-CPLs 163, 167, 170, a dropped optical signal receiving circuit 165, an added optical signal sending circuit 166, the optical amplifying part 220, an OR 168 and an OS 169.

The WDM optical signal is inputted from the optical transmission line 102 into the CPL 161 in the optical repeater station 108. The WDM optical signal is divided in the CPL 161 and one of these is inputted into the dropped optical signal receiving circuit 165, and the other is inputted into the optical amplifying part 220 through the optical signal rejecting part 162, the W-CPL 163 and the W-CPL 167. An optical signal which is outputted from the added optical signal sending circuit 166 is also inputted into the W-CPL 163. In the W-CPL 167, a wavelength of an OSC is demultiplexed from an output of the W-CPL 163, and the OSC is outputted to the OR 168. An output from the OR 168 is inputted into a CPU 224 in the optical amplifying part 220.

Next, the structure of the optical amplifying part 220 will be explained.

The WDM optical signal which is made incident on the optical amplifying part 220 is inputted into the CPL 221 through the CPL 131. In the CPL 131, a part of the WDM optical signal is inputted into a PD 140, and an output from the PD 140 is inputted through an A/D 146 into the CPU 224 as an operational circuit. The WDM optical signal is divided in the CPL 221 and one of these is inputted into the OSA 222 which measures a wavelength of incident light and optical power to the wavelength. The OSA control circuit 223 controls operations such as a wavelength range which is measured by the OSA 222, and inputs an output (spectrum) from the OSA 222 into the CPU 224.

The other WDM optical signal which is divided in the CPL 221 is inputted into an optical fiber amplifier on a first stage which is structured by including an EDF 133, CPLs 132, 134, LDs 141, 142, and an LD drive circuit 147. After being amplified in the optical fiber amplifier on the first stage, the WDM optical signal is inputted into a VAT 135. After being attenuated in the VAT 135, the WDM optical signal is inputted into an optical fiber amplifier on a second stage which is structured by including an EDF 137, CPLs 136, 138, LDs 143, 144, and an LD drive circuit 148. After being amplified in the optical fiber amplifier on the second stage, the WDM optical signal is inputted into a CPL 139. The WDM optical signal is divided in the CPL 139 and one of these is inputted into the W-CPL 170 as an amplification output of the optical amplifying part 220. The other WDM optical signal is received in a PD 145, and an output from the PD 145 is inputted into the CPU 224 through an A/D 149.

Meanwhile, the OS 169 generates an OSC which is modulated based on supervisory information renewed in the CPU 224. The OSC which is generated in the OS 169 is inputted into the W-CPL 170. In the W-CPL 170, the wavelengths of the WDM optical signal which is outputted from the CPL 139 in the optical amplifying part 220 and the OSC which is generated in the OS 169 are multiplexed, and thereafter, it is sent out as an output from the optical repeater station 108 to the optical transmission line 102.

The memory 225 is a storage circuit such as a semiconductor memory, in which a control program which controls the optical amplifying part 220, various data during the execution of the control program, an amplification band $\Delta f$ of the optical amplifying part 220, a bandwidth of ASE $\Delta f_{ch,j}$ which is rejected in order to drop an optical signal of one channel, a noise figure $NF_k$ of an optical amplifying part on a k-stage in the case that the optical amplifying part 220 is the optical amplifying part on the k-stage, a spontaneous emission coefficient $n_{spk}$ of the optical amplifying part and the like are stored.

The CPU 224 is connected to the added optical signal sending circuit 166, the A/Ds 146, 149, the LD drive circuits 147, 148, the OSA control circuit 223, the memory 225 and the OS 124, and sends/receives the signal to/from the respective circuits.

The optical receiving station 107 according to the third embodiment is structured by including a W-CPL 191, an OR 192, an optical amplifying part 220, a DEMUX 193 and ORs 194-1 to 194-*m*. Since the structure of the optical receiving station 107 is the same with that of the optical receiving station 103 except that the aforesaid optical amplifying part 220 is used instead of the optical amplifying part 130 in the optical receiving station 103 as shown in FIG. 6, the explanation of the structure of the optical receiving station 107 is omitted. It should be mentioned that the optical amplifying part 220 in the optical receiving station 107 is different from the optical amplifying part 220 in the optical repeater station 108 in that the CPU 224 is not connected to the added optical signal sending circuit 166 because the circuit is not included in the optical receiving station 107.

(Operation and Effects of the Third Embodiment)

The optical transmitting station 101 according to the third embodiment generates the WDM optical signal with a predetermined channel number by OSs 121-1 to 121-*m* and an MUX 122. A CPU 150 of the optical transmitting station 101 allows an OS 124 to generate the OSC which accommodates the supervisory information including an input channel number $m_0$ and accumulated ASE information $d_0$. The wavelength of the generated OSC is multiplexed to that of the WDM optical signal in a W-CPL 123 to be transmitted to an optical repeater station 108-1 on the next stage.

The WDM optical signal is repeated in sequence through the optical repeater stations 108 cascaded in multiple stages, in which an optical signal corresponding to a predetermined channel is added/dropped thereto/therefrom and the WDM optical signal is amplified, to be transmitted to the optical receiving station 107. Since the operations of the respective optical repeater stations 108 are the same with each other, the operation of an optical repeater station 108-*k* on the k-stage out of these will be hereinafter explained.

In the optical repeater station 108-*k*, the WDM optical signal which is inputted from the optical transmission line 102 is dropped in the CPL 161, and the optical signal corresponding to the predetermined channel is rejected from the WDM optical signal in the optical signal rejecting part 162. Newly added with the optical signal outputted from the added optical signal sending circuit 166, the WDM optical signal which is outputted from the optical signal rejecting part 162 is outputted to the W-CPL 167. In the W-CPL 167, the wavelength of the WDM optical signal is demultiplexed, and the OSC and the WDM optical signal are outputted to the OR 168 and the optical amplifying part 220, respectively.

Next, the control of the optical amplifying part 220 will be explained.

Figure 12:
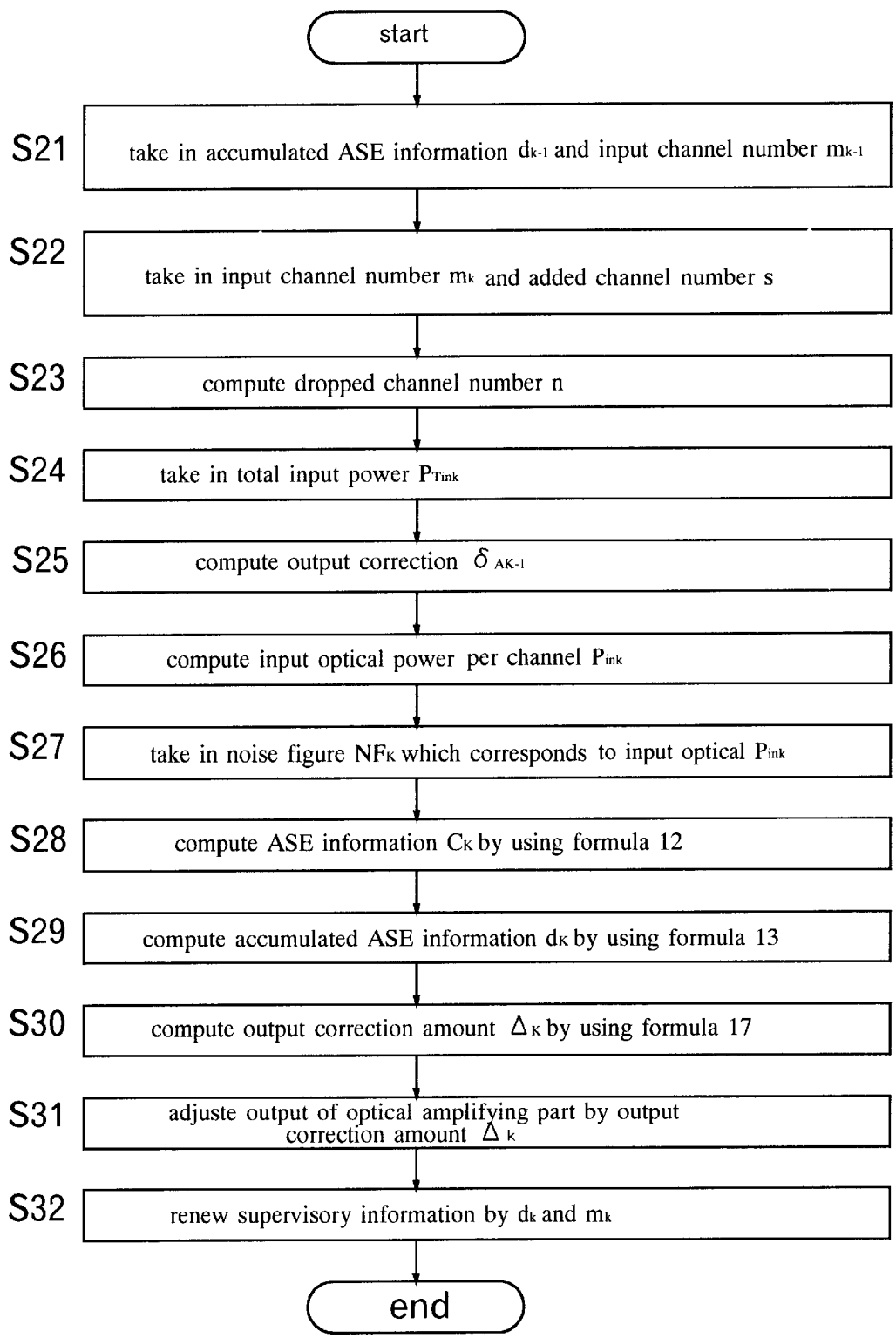
FIG. 12 is a flow chart explaining the control performed in an optical amplifying part according to the third embodiment.

FIG. 12 is a flow chart for the control in the optical amplifying part according to the third embodiment.

The CPU 224 of the optical amplifying part 220 takes in accumulated ASE information $d_{k-1}$ and an input channel number $M_{k-1}$ from the output of the OR 168 (S21).

The CPU 224 takes in an input channel number $m_k$ of the optical repeater station 108-*k* from the spectrum which is measured in the OSA 222 through the OSA control circuit 223, and takes in an added channel number s from the added optical signal sending circuit 166 (S22).

The CPU 224 computes a dropped channel number (rejected channel number) n from the input channel number $m_{k-1}$, the input channel number $m_k$ and the added channel number s (S23).

The CPU 224 takes in total input power $P_{Tink}$ from the output of the PD 140 which is inputted through the A/D 146 (S24).

The CPU 224 computes an output correction amount $\delta_{Ak-1}$ of the optical amplifying part on a k-1-stage as the preceding stage, by assuming that the WDM optical signal with the channel number $m_k$ is inputted into the optical amplifying part on the k-1 stage (S25).

The CPU 224 computes input optical power per channel $P_{ink}$ from the total input power $P_{Tink}$ and the input channel number $m_k$ (S26).

Referring to the memory 225, the CPU 224 takes in the noise figure $NF_k$ which corresponds to the input optical power $P_{ink}$ (S27).

The CPU 224 computes ASE information $c_k$ from the spontaneous emission coefficient $n_{spk}$ which is stored in the memory 225 and the input optical power $P_{ink}$, by using a formula 12 (S28).

The CPU 224 computes accumulated ASE information $d_k$ from the optical amplifying part of the optical transmitting station 101 to the optical amplifying part of the optical repeater station 108-*k* on the k-stage, from the spontaneous emission coefficient $n_{spk}$ and the input optical power $P_{ink}$, by using a formula 13 (S29). Incidentally, in this embodiment, the spontaneous emission coefficient $n_{spk}$ and the input optical power $P_{ink}$ in the optical amplifying parts of the respective stations are set to be the same with each other.

The CPU 224 computes an output correction amount $\Delta_k$ from the values which are computed in the above steps, by using a formula 17 (530).

The CPU 224 adjusts attenuation of the VAT 135 so that set attenuation is obtained. The CPU 224 adjusts a gain of the EDF 133 and a gain of the EDF 137 to obtain the output correction amount $\Delta_k$ while monitoring the output of the PD 145 which is inputted through the A/D 149 (S31).

The CPU 224 renews the supervisory information by the accumulated ASE information $d_k$ and the input channel number $m_k$ of the optical repeater station 108-*k*, and allows the OS 169 to generate the OSC based on the renewed supervisory information (532). The wavelengths of the generated OSC and the WDM optical signal which is amplified by a level corrected by the output correction amount $\Delta_k$ are multiplexed in the W-CPL 170 to be sent out to the optical transmission line 102.

Thus, in the optical repeater station 108-*k*, the output is corrected by the output correction amount with consideration of the power of the rejected ASE.

The WDM optical signal which is repeated in sequence is inputted into the optical receiving station 107 and amplified in the optical amplifying part 220 in the optical receiving station 107 by the level corrected by the output correction amount, similarly to the repeating station 108-*k*. The wavelength of the amplified WDM optical signal is demultiplexed in the DEMUX 193 by the optical signal corresponding to the respective channels, and the respective optical signals are received/processed in the ORs 194-1 to 194-*m*.

Thus, similarly to the second embodiment, the rejection of the ASE which occurs when the predetermined optical signal is dropped from the WDM optical signal during the multi-repeating is taken into consideration in the third embodiment, and therefore, a fluctuation in the level of the average optical power of the channel is prevented.

Next, another embodiment will be explained.

(Structure of a Fourth Embodiment)

The fourth embodiment is an embodiment of an optical communication system according to the present invention.

The optical communication system according to the fourth embodiment is a point-to-point optical communication system which includes an optical transmitting station 101, an optical receiving station 103 and an optical transmission line 102 for connecting these, in which optical repeater stations 104 in the necessary number are cascaded in the optical transmission line 102 in the optical communication system.

The structure of the optical communication system according to the fourth embodiment is the same with those shown in FIG. 1 to FIG. 6, except that a memory of an optical amplifying part 130 stores accumulated ASE information $d_k(j)$ from an optical amplifying part in the optical transmitting station to an optical amplifying part in an optical repeater station on a k-stage in a band of ch. j, accumulated ASE information $d_k$(other) from the optical amplifying part in the optical transmitting station to the optical amplifying part in the optical repeater station on the k-stage in a bandwidth of ASE $\Delta f_{ch}$ (other) which is not rejected in a band $\Delta f$ of the optical amplifying part, and a bandwidth of the ASE $\Delta f_{ch.}(j)$ which is rejected in order to drop an optical signal of the ch. j, and a bandwidth of the ASE $\Delta f_{ch.}$(other) which is not rejected, by using an OSC which accommodates supervisory information including a channel number (input channel number) $m_k$ of a WDM optical signal inputted into the optical amplifying part on the k-stage. Hence, the explanations of the structures of the respective stations are omitted.

(Operation and Effects of the Fourth Embodiment)

The optical transmitting station 101 according to the fourth embodiment generates the WDM optical signal with a predetermined channel number by OSs 121-1 to 121-m and an MUX 122. A CPU 150 of the optical transmitting station 101 allows an OS 124 to generate the OSC which accommodates the supervisory information including a multiplexing number $m_0$ of the WDM optical signal, the accumulated ASE information $d_k(j)$ from the optical amplifying part in the optical transmitting station to the optical amplifying part in the optical repeater station on the k-stage in the band of ch. j, and the accumulated ASE information $d_k$(other) from the optical amplifying part in the optical transmitting station to the optical amplifying part in the optical repeater station on the k-stage in the bandwidth of the ASE $\Delta f_{ch.}$(other) which is not rejected in the band $\Delta f$ of the optical amplifying part. The wavelength of the generated OSC is multiplexed to that of the WDM optical signal in a W-CPL 123 to be transmitted to an optical repeater station 104-1 on the next stage.

The WDM optical signal is repeated in sequence through the optical repeater stations 104 cascaded in multiple stages, in which an optical signal corresponding to a predetermined channel is added/dropped thereto/therefrom and the WDM optical signal is amplified, to be transmitted to the optical receiving station 103. Since the operations of the respective optical repeater stations 104 are the same with each other, the operation of an optical repeater station 104-k on the k-stage out of these will be hereinafter explained.

In the optical repeater station 104-k, the WDM optical signal which is inputted from the optical transmission line 102 is dropped in a CPL 161, and the optical signal corresponding to a predetermined channel is rejected from the WDM optical signal in an optical signal rejecting part 162. Newly added with an optical signal outputted from an added optical signal sending circuit 166, the WDM optical signal which is outputted from the optical signal rejecting part 162 is outputted to a W-CPL 167. In the W-CPL 167, the wavelength of the WDM optical signal is demultiplexed, and the OSC and the WDM optical signal are outputted to an OR 168 and an optical amplifying part 130, respectively.

Next, the control of the optical amplifying part 130 will be explained.

Figure 13:
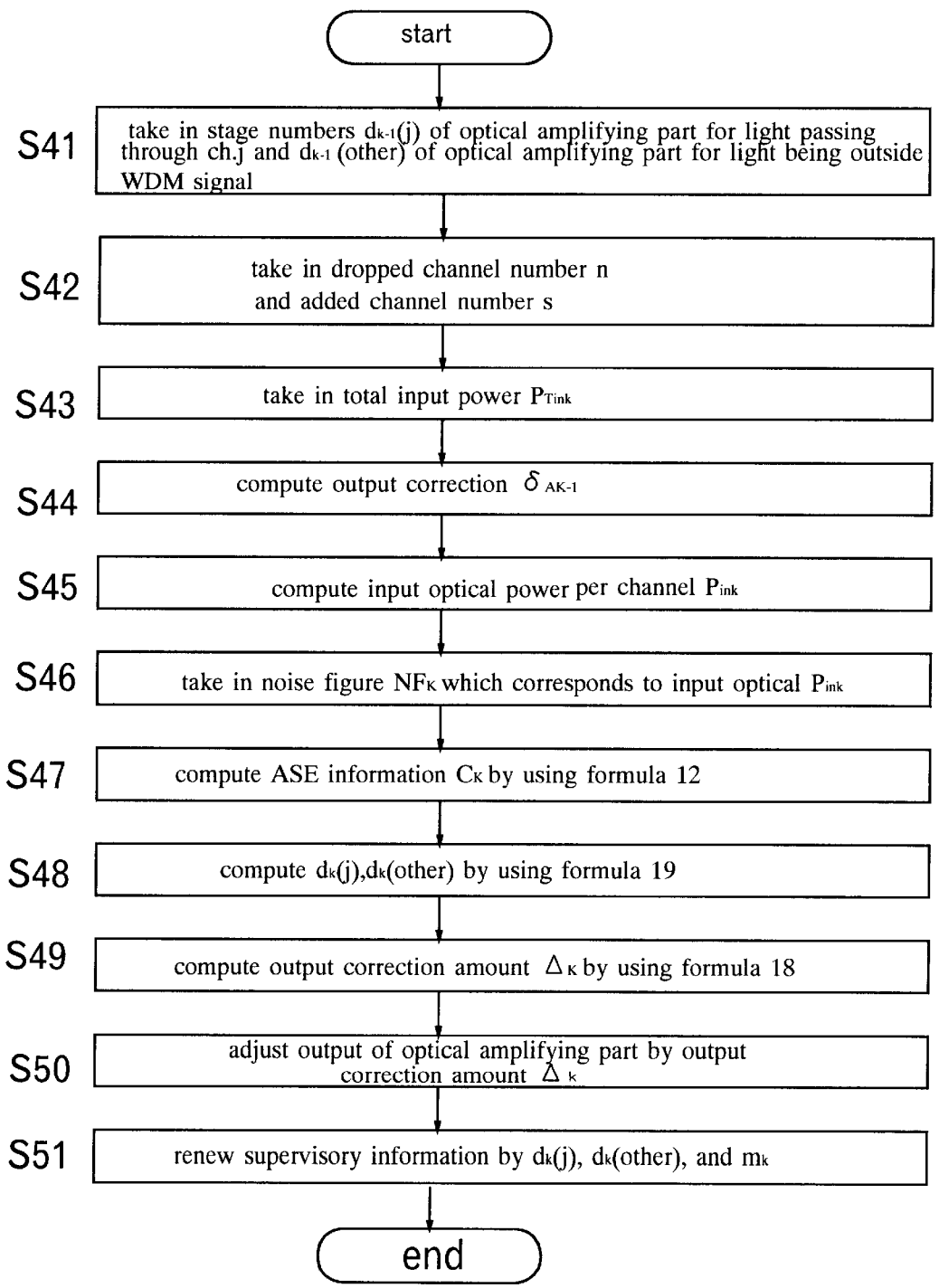
FIG. 13 is a flow chart explaining the control performed in an optical amplifying part according to a fourth embodiment.

FIG. 13 is a flow chart for the control in the optical amplifying part of the optical repeater station according to the fourth embodiment.

From an output of the OR 168, a CPU 150 of the optical amplifying part 130 takes in accumulated ASE information $d_{k-1}(j)$ from the optical amplifying part in the optical transmitting station to an optical amplifying part in an optical repeater station on a k–1-stage in the band of ch. j, accumulated ASE information $d_{k-1}$(other) from the optical amplifying part in the optical transmitting station to the optical amplifying part in the optical repeater station on the k–1-stage in the bandwidth of the ASE $\Delta f_{ch.}$(other) which is not rejected in the band $\Delta f$ of the optical amplifying part, and an input channel number $m_{k-1}$ (S41).

The CPU 150 takes in a dropped channel number (rejected channel number) n from an output of a control circuit 164 of the signal rejecting part, and takes in an added channel number s from the added optical signal sending circuit 166 (S42).

The CPU 150 takes in total input power $P_{Tink}$ from an output of a PD 140 which is inputted through an A/D 146 (S43).

The CPU 150 computes an output correction amount $\delta_{Ak-12}$ of the optical amplifying part on the k–1-stage as the preceding stage, by assuming that the WDM optical signal with a channel number $m_k$ is inputted into the optical amplifying part on the k–1 stage (S44).

The CPU 150 computes the input channel number $m_k$ of the optical amplifying part on the k-stage from the input channel number $m_{k-1}$, the dropped channel number n and the added channel number s, and computes input optical power per channel $P_{ink}$ from the total input power $P_{Tink}$ and the input channel number $m_k$ (S45).

Referring to a memory 151, the CPU 150 takes in a noise figure $NF_k$ which corresponds to the input optical power $P_{ink}$ (S46).

The CPU 150 computes ASE information $c_k$ from a spontaneous emission coefficient $n_{spk}$ which is stored in the memory 151 and the input optical power $P_{ink}$, by using a formula 12 (S47).

When the noise figure $NF_k$ which is taken therein in S46 is used, instead of the spontaneous emission coefficient $n_{spk}$, it is also possible to computes $c_k$ from a formula 14.

The CPU 150 computes $d_k(j)$ and $d_k$(other) from the optical amplifying part of the optical transmitting station 101 to the optical amplifying part of the optical repeater station 104-k on the k-stage (S48).

The CPU 150 computes an output correction amount $\Delta_k$ from the values which are computed in the above steps, by using a formula 18 (S49).

The CPU 150 adjusts attenuation of a VAT 135 so that set attenuation is obtained. The CPU 150 adjusts a gain of an EDF 133 and a gain of an EDF 137 to obtain the output correction amount $\Delta_k$ while monitoring an output of a PD 145 which is inputted through an A/D 149 (S50).

The CPU 150 renews the supervisory information by the accumulated ASE information $d_k(j)$ from the optical amplifying part in the optical transmitting station to the optical amplifying part in the optical repeater station on the k-stage in the band of ch. j, the accumulated ASE information $d_k$(other) from the optical amplifying part in the optical transmitting station to the optical amplifying part in the optical repeater station on the k-stage in the bandwidth of the ASE $\Delta f_{ch}$(other) which is not rejected in the band $\Delta f$ of the optical amplifying part, and the input channel number $m_k$, and allows an OS 169 to generate an OSC based on the renewed supervisory information (SS1). The wavelengths of the generated OSC and the WDM optical signal which is amplified by a level corrected by the output correction amount $\Delta_k$ are multiplexed in a W-CPL 170 to be sent out to the optical transmission line 102.

Thus, in the optical repeater station 104-k, the output is corrected by the correction amount with consideration of the power of the rejected ASE.

The WDM optical signal which is repeated in sequence is inputted into the optical receiving station 103 and amplified in an optical amplifying part 130 of the optical receiving station 103 by the level corrected by the output correction amount, similarly to the repeating station 104-k. The wavelength of the amplified WDM optical signal is demultiplexed in a DEMUX 193 by the optical signal corresponding to the respective channels, and the respective optical signals are received/processed in ORs 194-1 to 194-m.

As described above, according to the fourth embodiment, the WDM optical signal is optically amplified with consideration of the ASE level on each of the channels, so that a fluctuation in the level of the average optical power of the channel is further prevented even if the optical signal is added/dropped thereto/therefrom during repeated transmissions. For this reason, by an optical communication system according to the fourth embodiment, a gain deviation between the optical signals which correspond to the respective channels of the WDM optical signal can be further suppressed, and an optical SNR can be further prevented from degrading due to decrease of the channel number even with a small wavelength multiplexing number.

Next, another embodiment will be explained.

(Structure of a Fifth Embodiment)

The fifth embodiment is an embodiment of an optical communication system according to the present invention.

The optical communication system according to the fifth embodiment is a point-to-point optical communication system which includes an optical transmitting station 101, an optical receiving station 107 and an optical transmission line 102 for connecting these, in which optical repeater stations 108 in the necessary number are cascaded in the optical transmission line 102 in the optical communication system.

The structure of the optical communication system according to the fifth embodiment is the same with that in the third embodiment, except that a memory of an optical amplifying part 130 stores accumulated ASE information $d_k(j)$ from an optical amplifying part in the optical transmitting station to an optical amplifying part in an optical repeater station on a k-stage in a band of ch. j, accumulated ASE information $d_k$(other) from the optical amplifying part in the optical transmitting station to the optical amplifying part in the optical repeater station on the k-stage in a bandwidth of ASE $\Delta f_{ch}$(other) which is not rejected in a band $\Delta f$ of the optical amplifying part, and a bandwidth of the ASE $\Delta f_{ch}(j)$ which is rejected in order to drop an optical signal of the ch. j, and a bandwidth of the ASE $\Delta f_{ch}$(other) which is not rejected, by using an OSC which accommodates supervisory information including a channel number (input channel number) $m_k$ of a WDM optical signal inputted into the optical amplifying part on the k-stage. Hence, the explanations of the structures of the respective stations are omitted.

(Operation and Effects of the Fifth Embodiment)

The optical transmitting station 101 according to the fifth embodiment generates the WDM optical signal with a predetermined channel number by OSs 121-1 to 121-m and an MUX 122. A CPU 150 of the optical transmitting station 101 allows an OS 124 to generate the OSC which accommodates the supervisory information including a multiplexing number $m_0$ of the WDM optical signal, the accumulated ASE information $d_k(j)$ from the optical amplifying part in the optical transmitting station to the optical amplifying part in the optical repeater station on the k-stage in the band of ch. j, and the accumulated ASE information $d_k$(other) from the optical amplifying part in the optical transmitting station to the optical amplifying part in the optical repeater station on the k-stage in the bandwidth of the ASE $\Delta f_{ch}$(other) which is not rejected in the band $\Delta f$ of the optical amplifying part. The wavelength of the generated OSC is multiplexed to that of the WDM optical signal in a W-CPL 123 to be transmitted to an optical repeater station 108-1 on the next stage.

The WDM optical signal is repeated in sequence through the optical repeater stations 108 cascaded in multiple stages, in which an optical signal corresponding to a predetermined channel is added/dropped thereto/therefrom and the WDM optical signal is amplified, to be transmitted to the optical receiving station 107. Since the operations of the respective optical repeater stations 108 are the same with each other, the operation of an optical repeater station 108-k on the k-stage out of these will be hereinafter explained.

In the optical repeater station 108-k, the WDM optical signal which is inputted from the optical transmission line 102 is dropped in a CPL 161, and an optical signal corresponding to a predetermined channel is rejected from the WDM optical signal in an optical signal rejecting part 162. Newly added with an optical signal outputted from an added optical signal sending circuit 166, the WDM optical signal which is outputted from the optical signal rejecting part 162 is outputted to a W-CPL 167. In the W-CPL 167, the wavelength of the WDM optical signal is demultiplexed, and the OSC and the WDM optical signal are outputted to an OR 168 and an optical amplifying part 220, respectively.

Next, the control of the optical amplifying part 220 will be explained.

Figure 14:
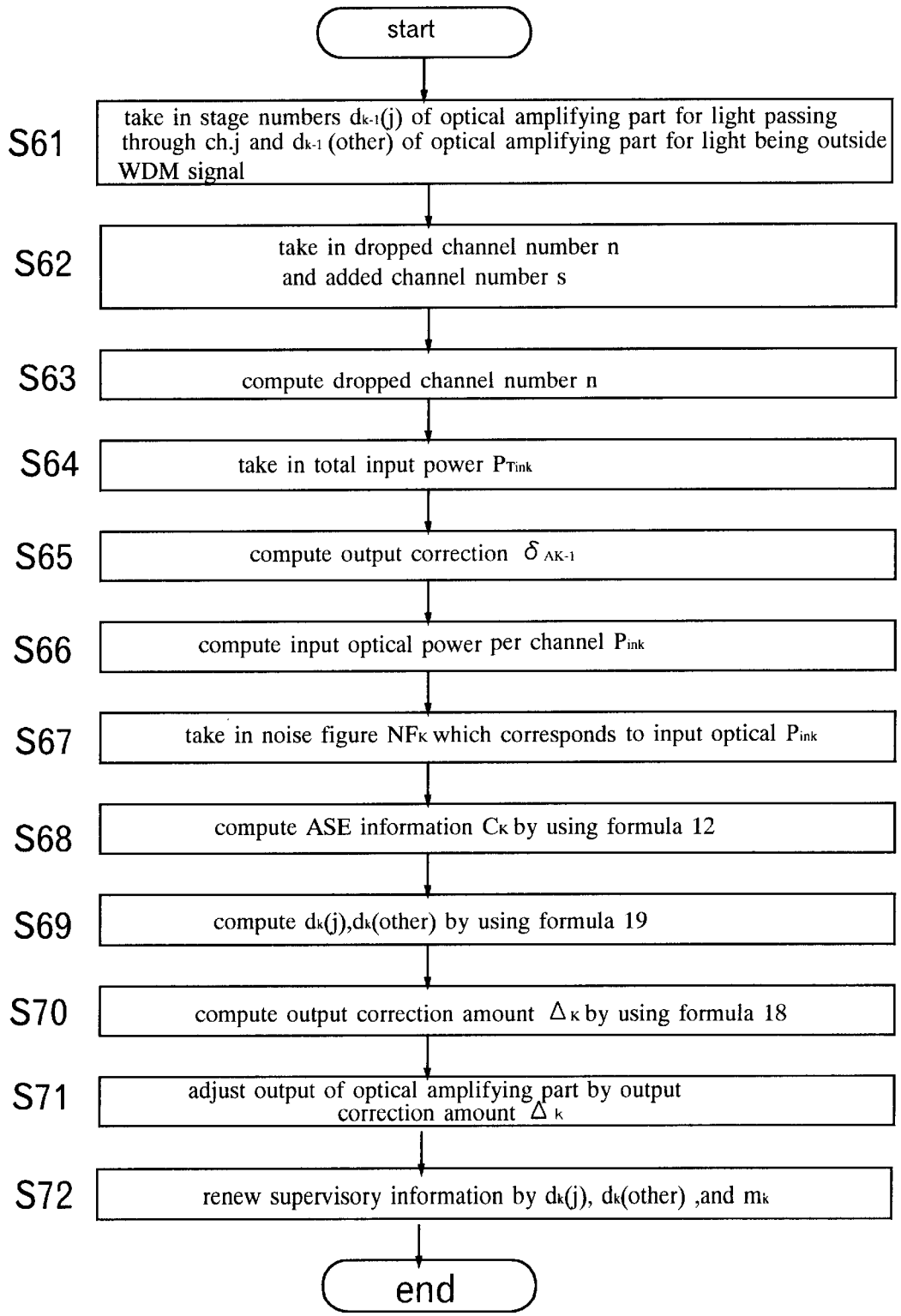
FIG. 14 is a flow chart explaining the control performed in an optical amplifying part according to a fifth embodiment.
Figure 15:
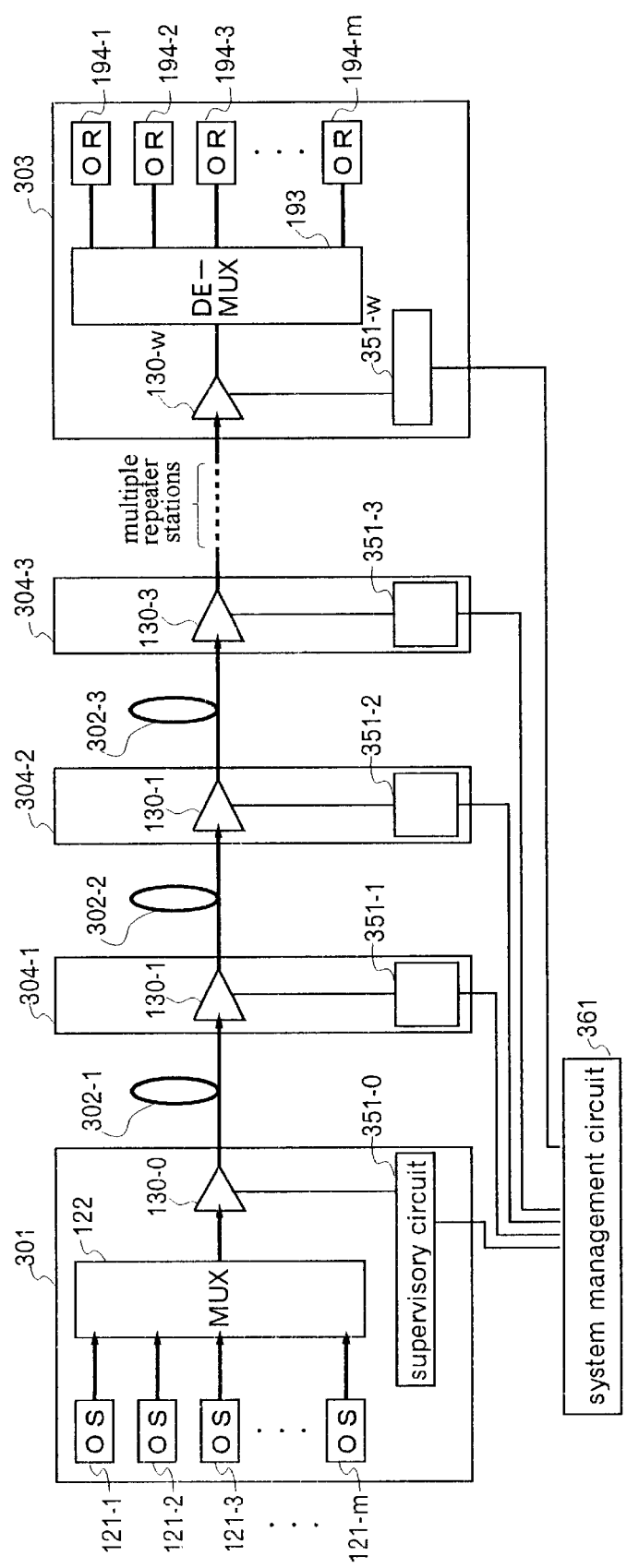
FIG. 15 is a view showing the structure of an optical communication system according to a sixth embodiment.
Figure 16:
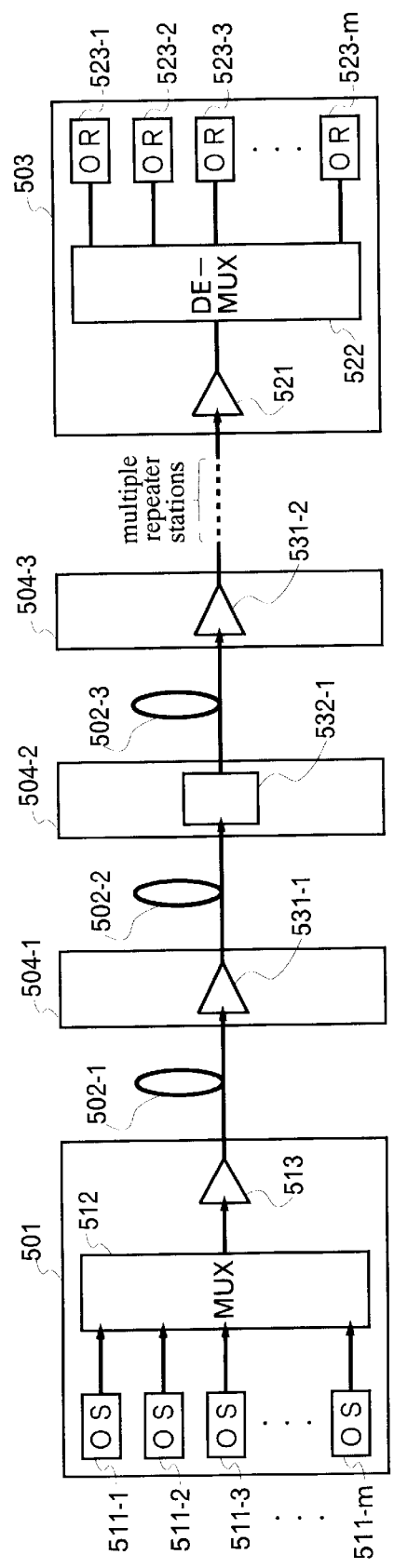
FIG. 16 is a view showing the structure of a conventional optical communication system.

FIG. 14 is a flow chart for the control in the optical amplifying part of the optical repeater station according to the fifth embodiment.

From an output of the OR 168, a CPU 224 of the optical amplifying part 220 takes in accumulated ASE information $d_{k-1}(j)$ from the optical amplifying part in the optical transmitting station to an optical amplifying part in an optical repeater station on a k-1-stage in the band of the ch. j, accumulated ASE information $d_{k-1}$(other) from the optical amplifying part in the optical transmitting station to the optical amplifying part in the optical repeater station on the k-1-stage in the bandwidth of the ASE $\Delta f_{ch}$(other) which is not rejected in the band $\Delta f$ of the optical amplifying part, and an input channel number $m_{k-1}$ (S61).

The CPU 224 takes in the input channel number $m_k$ of the optical repeater station 108-k from a spectrum which is measured in an OSA 222 through an OSA control circuit 223, and takes in an added channel number s from the added optical signal sending circuit 166 (S62).

The CPU 224 computes a dropped channel number (rejected channel number) n from the input channel number $m_{k-1}$, the input channel number $m_k$ and the added channel number s (S63).

The CPU 224 takes in total input power $P_{Tink}$ from an output of a PD 140 which is inputted through an A/D 146 (S64).

The CPU 224 computes an output correction amount $\delta_{Ak-1}$ of the optical amplifying part on the k−1-stage as the preceding stage, by assuming that the WDM optical signal with the channel number $m_k$ is inputted into the optical amplifying part on the k−1 stage (S65).

The CPU 224 computes the input channel number $m_k$ of the optical amplifying part on the k-stage from the input channel number $m_{k-1}$, the dropped channel number n and the added channel number s, and computes input optical power per channel $P_{ink}$ from the total input power $P_{Tink}$ and the input channel number $m_k$ (S66).

Referring to a memory 225, the CPU 224 takes in a noise figure $NF_k$ which corresponds to the input optical power $P_{ink}$ (S67).

The CPU 224 computes ASE information $c_k$ from a spontaneous emission coefficient $n_{spk}$ which is stored in the memory 225 and the input optical power $P_{ink}$, by using a formula 12 (S68).

The CPU 224 computes $d_k(j)$ and $d_k(other)$ from the optical amplifying part of the optical transmitting station 101 to the optical amplifying part of the optical repeater station 108-$k$ on the k-stage (S69).

The CPU 224 computes an output correction amount $\Delta_k$ from the values which are computed in the above steps, by using a formula 18 (S70).

The CPU 224 adjusts attenuation of a VAT 135 so that set attenuation is obtained. The CPU 224 adjusts a gain of an EDF 133 and a gain of an EDF 137 to obtain the output correction amount $\Delta_k$ while monitoring an output of a PD 145 which is inputted through an A/D 149 (S71).

The CPU 224 renews the supervisory information by the accumulated ASE information $d_k(j)$ from the optical amplifying part in the optical transmitting station to the optical amplifying part in the optical repeater station on the k-stage in the band of ch. j, the accumulated ASE information $d_k(other)$ from the optical amplifying part in the optical transmitting station to the optical amplifying part in the optical repeater station on the k-stage in the bandwidth of the ASE $\Delta f_{ch.}(other)$ which is not rejected in the band $\Delta f$ of the optical amplifying part, and the input channel number $m_k$, and allows an OS 169 to generate an OSC based on the renewed supervisory information (S72). The wavelengths of the generated OSC and the WDM optical signal which is amplified by a level corrected by the output correction amount $\Delta_k$ are multiplexed in a W-CPL 170 to be sent out to the optical transmission line 102.

Thus, in the optical repeater station 108-$k$, the output is corrected by the correction amount with consideration of the power of the rejected ASE.

The WDM optical signal which is repeated in sequence is inputted into the optical receiving station 107 and amplified in an optical amplifying part 220 of the optical receiving station 107 by the level corrected by the output correction amount, similarly to the optical repeating station 108-$k$. The wavelength of the amplified WDM optical signal is demultiplexed in a DEMUX 193 by the optical signal corresponding to the respective channels, and the respective optical signals are received/processed in ORs 194-1 to 194-$m$.

As described above, according to the fifth embodiment, the WDM optical signal is optically amplified with consideration of the ASE level on each of the channels, similarly to the fourth embodiment, so that a fluctuation in the level of the average optical power of the channel is further prevented even if the optical signal is added/dropped thereto/therefrom during repeated transmissions.

Next, another embodiment will be explained.

(Structure of a Sixth Embodiment)

The sixth embodiment is an embodiment of an optical communication system according to the present invention.

The optical communication system according to the sixth embodiment is a point-to-point optical communication system which includes an optical transmitting station 301, an optical receiving station 303 and an optical transmission line 302 for connecting these, in which optical repeater stations 304 in the necessary number, each of which has an optical amplifying function and an OADM function, are cascaded in the optical transmission line 302 in the optical communication system. Further, the optical communication system includes a system management circuit 361 which manages the respective circuits.

The structures of the respective stations in the optical communication system according to the sixth embodiment are the same as those shown in FIG. 1 to FIG. 6, except that the respective stations include a supervisory circuit 351 which is notified of $d_k$, $m_k$, $P_{Tink}$, n, $NF_k$, $\Delta f$ and $\Delta f_{ch.}$ from a CPU 150 of an optical amplifying part 130, transfers the above information to the system management circuit 361 and receives signals from the system management circuit 361, and hence explanations thereof are omitted.

(Operation and Effects of the Sixth Embodiment)

In the optical communication system according to the second to the fifth embodiments, an output correction amount $\Delta$ is computed in sequence by optical repeater stations 104 to 106, 108 from an optical transmitting station 101 (upstream side) toward optical receiving stations 103, 107 (downstream side). In the sixth embodiment, however, the system management circuit 361 collects data which are necessary for the output correction amount $\Delta$ from the respective stations, computes these and notifies the respective stations of the output correction amount $\Delta$ as a result of the computation.

In the optical communication system according to the sixth embodiment, respective supervisory circuits 351-0 to 351-$w$ of the optical transmitting station 301, the respective optical repeater stations 304 and the optical receiving station 303 send signals which accommodate accumulated ASE information $d_k$, input channel number $m_k$, total input power $P_{Tink}$, a dropped channel number n, a noise figure $NF_k$, an amplification band $\Delta f$ and an ASE rejected band $\Delta f_{ch.}$ of its own station to the system management circuit 361.

The system management circuit 361 extracts the above information from the received signals, and carries out operations for output correction amounts $\Delta_0$ to $\Delta_w$, by using a formula 12, a formula 13 and a formula 17. The system management circuit 361 generates signals which accommodate respectively the output correction amounts $\Delta_0$ to $\Delta_w$ as the results of the operations. The system management circuit 361 transmits the generated signals to the corresponding stations, respectively.

Each of the supervisory circuits 351-0 to 351-$w$ of the respective stations extracts the output correction amount $\Delta$ of its own station from the signals sent from the system management circuit 361. Each of the supervisory circuits 351-0 to 351-$w$ outputs the output correction amount $\Delta$ to the CPU 150 of the optical amplifying part 130. In the respective stations, the CPU 150 of the optical amplifying station 130 adjusts gains of EDFs 133, 137, thereby correcting the output of its own station by the output correction amount Δ, similarly to the second to the fifth embodiments.

Thus, in the sixth embodiment, the output correction amount Δ can be managed by the system management circuit 351 in a centralized manner.

The invention is not limited to the above embodiments and various modifications may be made without departing from the spirit and the scope of the invention. Any improvement may be made in part or all of the components.

What is claimed is:

1. An optical amplifying apparatus for amplifying input light so that an optical power of output light has a predetermined fixed value, comprising:

a correction section for correcting said predetermined fixed value by a correction amount according to an optical power of amplified spontaneous emission when the optical power of the amplified spontaneous emission included in said input light has different values in different wavelength bands from each other, wherein said input light is repeatedly transmitted while being amplified by optical amplifiers for amplifying light, and is a wavelength-division multiplexed optical signal in which an optical signal corresponding to a predetermined channel is dropped/added during the repeated transmissions; and said correction amount is computed based on: accumulated ASE information $d_k$ as an optical power of said amplified spontaneous emission being accumulated to said input light; an input channel number $m_k$ as a number of channels of said wavelength-division multiplexed optical signal as said input light; a total input power $P_{Tink}$ as a total optical power of said input light; a dropped channel number n as a number of channels of said wavelength-division multiplexed optical signal to be dropped during transmission; an ASE rejected band $\Delta f_{ch.}$ as a bandwidth of said amplified spontaneous emission to be rejected corresponding to a drop of one channel; a noise figure $NF_k$; and an amplification band $\Delta f$.

2. An optical amplifying apparatus for amplifying input light so that an optical power of output light has a predetermined fixed value, comprising:

a correction section for correcting said predetermined fixed value by a correction amount according to an optical power of amplified spontaneous emission when the optical power of the amplified spontaneous emission included in said input light has different values in different wavelength bands from each other, wherein said input light is repeatedly transmitted while being amplified by optical amplifiers for amplifying light, and is a wavelength-division multiplexed optical signal in which an optical signal corresponding to a predetermined channel is dropped/added during the repeated transmissions; and said correction amount is computed based on: accumulated ASE information $e_k(j)$ as an optical power of said amplified spontaneous emission being accumulated to every channel of said input light; out-band accumulated ASE information $e_k(other)$ as an optical power of said amplified spontaneous emission accumulated to light being outside of a wavelength band of said wavelength-division multiplexed optical signal; an input channel number $m_k$ as a number of channels of said wavelength-division multiplexed optical signal as said input light; a total input power $P_{Tink}$ as a total optical power of said input light; and a noise figure $NF_k(j)$ of every channel.

3. An optical amplifying apparatus amplifying input light so that an optical power of output light has a predetermined fixed value, comprising:

a correction section correcting the predetermined fixed value by a correction amount according to an optical power of amplified spontaneous emission (ASE) when the optical power of the ASE included in the input light has different values in different wavelength bands from each other, wherein the input light is repeatedly transmitted while being amplified by optical amplifiers for amplifying light, and is a wavelength-division multiplexed optical signal in which an optical signal corresponding to a predetermined channel is dropped/added during the repeated transmissions, and the correction amount is computed based on accumulated ASE information as an optical power of the ASE being accumulated to the input light, an input channel number as a number of channels of the wavelength-division multiplexed optical signal as the input light, a total input power as a total optical power of the input light, a dropped channel number n as a number of channels of the wavelength-division multiplexed optical signal to be dropped during transmission, an ASE rejected band as a bandwidth of the ASE to be rejected corresponding to a drop of one channel, a noise figure, and an amplification band.

4. An optical amplifying apparatus amplifying input light so that an optical power of output light has a predetermined fixed value, comprising:

a correction section for correcting the predetermined fixed value by a correction amount according to an optical power of amplified spontaneous emission (ASE) when the optical power of the ASE included in the input light has different values in different wavelength bands from each other, wherein the input light is repeatedly transmitted while being amplified by optical amplifiers for amplifying light, and is a wavelength-division multiplexed optical signal in which an optical signal corresponding to a predetermined channel is dropped/added during the repeated transmissions, and the correction amount is computed based on accumulated ASE information as an optical power of the ASE being accumulated to every channel of the input light, out-band accumulated ASE information as an optical power of the ASE accumulated to light being outside of a wavelength band of the wavelength-division multiplexed optical signal, an input channel number as a number of channels of the wavelength-division multiplexed optical signal as the input light; a total input power as a total optical power of the input light, and a noise figure of every channel.

5. An apparatus comprising:

an optical amplifier receiving an input light and amplifying the input light to thereby produce an amplified input light having optical power at a predetermined fixed value as an output light of the optical amplifier, the input light received by the optical amplifier being a wavelength division multiplexed (WDM) optical signal which was repeatedly optically amplified and had an optical signal corresponding to a predetermined channel dropped/added before being received by the optical amplifier; and a corrector correcting the predetermined fixed value by a correction amount when optical power of amplified spontaneous emission (ASE) in the input light has different values in different wavelength bands, the correction amount being computed based on an optical power of the ASE accumulated in the input light, a number of channels of the WDM optical signal as the input light, a total optical power of the input light, a number of channels of the WDM optical signal to be dropped during transmission, a bandwidth of the ASE to be rejected corresponding to a drop of one channel, a noise figure, and an amplification band.

6. An apparatus as in claim 5, wherein the optical amplifier comprises:

a first optical amplifier amplifying the input light, to thereby produce a first optical amplifier amplified light;

an optical attenuator attenuating the first optical amplifier amplified light, to thereby produce an attenuated light; and a second optical amplifier amplifying the attenuated light, to thereby produce the output light.

7. An apparatus as in claim 6 wherein the corrector controls at least one of a gain of the first optical amplifier and a gain of the second optical amplifier so that the output light has an output power corresponding to the predetermined fixed value corrected by the correction amount.

8. An apparatus comprising:

an optical amplifier receiving an input light and amplifying the input light to thereby produce an amplified input light having optical power at a predetermined fixed value as an output light of the optical amplifier, the input light received by the optical amplifier being a wavelength division multiplexed (WDM) optical signal which was repeatedly optically amplified and had an optical signal corresponding to a predetermined channel dropped/added before being received by the optical amplifier; and a corrector correcting the predetermined fixed value by a correction amount when optical power of amplified spontaneous emission (ASE) in the input light has different values in different wavelength bands, the correction amount being computed based on an optical power of the ASE accumulated in every channel of the input light, an optical power of the ASE accumulated in light outside of a wavelength band of the WDM optical signal, a number of channels of the WDM optical signal as the input light, a total optical power of the input light, and a noise figure of every channel.

9. An apparatus as in claim 8, wherein the optical amplifier comprises:

a first optical amplifier amplifying the input light, to thereby produce a first optical amplifier amplified light;

an optical attenuator attenuating the first optical amplifier amplified light, to thereby produce an attenuated light; and a second optical amplifier amplifying the attenuated light, to thereby produce the output light.

10. An apparatus as in claim 9, wherein the corrector controls at least one of a gain of the first optical amplifier and a gain of the second optical amplifier so that the output light has an output power corresponding to the predetermined fixed value corrected by the correction amount.

11. An apparatus comprising:

means for receiving an input light and for amplifying the input light to thereby produce an amplified input light having optical power at a predetermined fixed value as an output light, the received input light being a wavelength division multiplexed (WDM) optical signal which was repeatedly optically amplified and had an optical signal corresponding to a predetermined channel dropped/added before being received by said means; and means for correcting the predetermined fixed value by a correction amount when optical power of amplified spontaneous emission (ASE) in the input light has different values in different wavelength bands, the correction amount being computed based on an optical power of the ASE accumulated in the input light, a number of channels of the WDM optical signal as the input light, a total optical power of the input light, a number of channels of the WDM optical signal to be dropped during transmission, a bandwidth of the ASE to be rejected corresponding to a drop of one channel, a noise figure, and an amplification band.

12. An apparatus comprising:

means for receiving an input light and for amplifying the input light to thereby produce an amplified input light having optical power at a predetermined fixed value as an output light, the received input light being a wavelength division multiplexed (WDM) optical signal which was repeatedly optically amplified and had an optical signal corresponding to a predetermined channel dropped/added before being received by said means; and means for correcting the predetermined fixed value by a correction amount when optical power of amplified spontaneous emission (ASE) in the input light has different values in different wavelength bands, the correction amount being computed based on an optical power of the ASE accumulated in every channel of the input light, an optical power of the ASE accumulated in light outside of a wavelength band of the WDM optical signal, a number of channels of the WDM optical signal as the input light, a total optical power of the input light, and a noise figure of every channel.

* * * * *